US010914252B2

(12) United States Patent
Yoshioka

(10) Patent No.: US 10,914,252 B2
(45) Date of Patent: Feb. 9, 2021

(54) EGR APPARATUS OF ENGINE

(71) Applicant: AISAN KOGYO KABUSHIKI KAISHA, Obu (JP)

(72) Inventor: Mamoru Yoshioka, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 157 days.

(21) Appl. No.: 16/150,396

(22) Filed: Oct. 3, 2018

(65) Prior Publication Data

US 2019/0107064 A1 Apr. 11, 2019

(30) Foreign Application Priority Data

Oct. 5, 2017 (JP) ................................. 2017-195397
May 28, 2018 (JP) ................................. 2018-101325

(51) Int. Cl.
*F02D 41/00* (2006.01)
*F02M 26/49* (2016.01)
*F02M 26/47* (2016.01)
*F02D 41/22* (2006.01)

(52) U.S. Cl.
CPC ..... *F02D 41/0077* (2013.01); *F02D 41/0052* (2013.01); *F02D 41/0072* (2013.01); *F02D 41/22* (2013.01); *F02D 41/221* (2013.01); *F02M 26/47* (2016.02); *F02M 26/49* (2016.02); *F02D 2200/0406* (2013.01); *F02D 2200/0408* (2013.01); *F02D 2200/101* (2013.01); *F02D 2200/1002* (2013.01)

(58) Field of Classification Search
CPC ............. F02D 41/0077; F02D 41/0072; F02D 41/221; F02D 41/22; F02D 41/0052; F02D 2200/101; F02D 2200/0408; F02D 2200/1002; F02D 2200/0406; F02D 41/007; F02M 26/49; F02M 26/47; F02M 26/50; F02M 26/05
USPC ...................................................... 123/568.16
See application file for complete search history.

(56) References Cited

U.S. PATENT DOCUMENTS

2013/0319383 A1* 12/2013 Yoshioka ............ F02D 41/0077
123/568.21
2014/0298801 A1 10/2014 Akita et al.

FOREIGN PATENT DOCUMENTS

JP          10196463 A  *  7/1998  ............ F02M 26/48
JP          H10-196463 A    7/1998
JP          2013-083249 A   5/2013
(Continued)

*Primary Examiner* — Joseph J Dallo
*Assistant Examiner* — Scott A Reinbold
(74) *Attorney, Agent, or Firm* — Oliff PLC

(57) ABSTRACT

An EGR apparatus includes an EGR passage to allow part of exhaust gas discharged from an engine to an exhaust passage to flow as EGR gas into an intake passage; an EGR valve to regulate an EGR flow rate in the EGR passage; various sensors for detecting an engine running state; and an ECU to control the EGR valve based on the detected running state to diagnose abnormality in the EGR valve. The ECU calculates a reference intake pressure according the detected engine rotation speed and load by reference to a reference intake pressure map showing a relationship of the reference intake pressure to engine rotation speed, and engine load, and determine whether or not the EGR valve has abnormality in opening/closing by comparing the reference intake pressure with the detected intake pressure.

7 Claims, 26 Drawing Sheets

(56) References Cited

FOREIGN PATENT DOCUMENTS

| | | | |
|---|---|---|---|
| JP | 2014-202137 | A | 10/2014 |
| JP | 5828806 | B2 | 12/2015 |
| JP | 6071799 | B2 | 2/2017 |
| JP | 2017-044172 | A | 3/2017 |
| JP | 2017044172 | A * | 3/2017 |
| JP | 2017-172573 | A | 9/2017 |
| JP | 2017172573 | A * | 9/2017 |

* cited by examiner

FIG. 6

| KL (%) \ NE (rpm) | 500 | 1000 | 1500 | 2000 | 2500 | 3000 |
|---|---|---|---|---|---|---|
| 10 | 28.0 | 26.3 | 25.1 | 22.5 | 22.3 | 22.0 |
| 15 | 38.5 | 36.4 | 34.8 | 31.8 | 31.3 | 30.6 |
| 20 | 49.0 | 46.4 | 44.6 | 41.1 | 40.3 | 39.2 |
| 25 | 59.0 | 56.4 | 54.3 | 50.4 | 49.3 | 47.8 |
| 30 | 70.0 | 66.4 | 64.0 | 59.7 | 58.3 | 56.3 |
| 35 | 80.0 | 76.4 | 73.8 | 69.0 | 67.3 | 64.9 |
| 40 | 90.0 | 86.4 | 83.5 | 78.3 | 76.3 | 73.5 |

PMegr0

FIG. 10

| KL (%) | NE (rpm) | | | | | |
|---|---|---|---|---|---|---|
| | 500 | 1000 | 1500 | 2000 | 2500 | 3000 |
| 10 | 60.0 | 46.7 | 39.8 | 31.9 | 30.2 | 29.1 |
| 15 | 70.0 | 56.2 | 48.4 | 41.0 | 39.0 | 37.6 |
| 20 | 81.0 | 65.7 | 56.9 | 50.2 | 47.9 | 46.0 |
| 25 | 92.0 | 75.1 | 65.5 | 59.3 | 56.7 | 54.4 |
| 30 | 102.0 | 84.6 | 74.0 | 68.5 | 65.5 | 62.9 |
| 35 | 110.0 | 94.1 | 82.6 | 77.7 | 74.4 | 71.3 |
| 40 | 120.0 | 103.6 | 91.1 | 86.8 | 83.2 | 79.8 |

PMegr20

FIG. 24

| KL (%) \ NE (rpm) | 8 | 12 | 16 | 20 | ... | ... | 56 | 60 |
|---|---|---|---|---|---|---|---|---|
| 10 | 0 | 3 | 5 | 8 | ... | ... | 15 | 15 |
| 20 | 0 | 10 | 13 | 15 | ... | ... | 30 | 30 |
| 30 | 0 | 18 | 25 | 30 | ... | ... | 40 | 40 |
| 40 | ... | 25 | 30 | 40 | ... | ... | 60 | 60 |
| ... | ... | ... | ... | ... | ... | ... | ... | ... |
| 70 | 0 | 100 | 100 | 100 | ... | ... | 100 | 100 |
| 80 | 0 | 100 | 100 | 100 | ... | ... | 100 | 100 |
| 90 | 0 | 100 | 100 | 100 | ... | ... | 100 | 100 |

Values: $T_{egr2}$

EGR APPARATUS OF ENGINE

CROSS-REFERENCE TO RELATED APPLICATIONS

This application is based upon and claims the benefit of priority from each of the prior Japanese Patent Applications No. 2017-195397 filed on Oct. 5, 2017 and No. 2018-101325 filed on May 28, 2018, the entire contents of which are incorporated herein by reference.

BACKGROUND

Technical Field

The present disclosure relates to an EGR apparatus configured to recirculate part of exhaust gas of an engine as EGR gas into an intake passage through an EGR passage and, more particularly, to an EGR apparatus of an engine configured to diagnose abnormality in opening/closing operation of an EGR valve provided in the EGR passage.

Related Art

As the above type of technique, conventionally, there has been known an art disclosed in for example Japanese Patent No. 6071799. This technique relates to a failure detection device for an exhaust gas recirculation (EGR) apparatus of an engine. The engine includes an intake passage, an exhaust passage, a fuel supply unit, and an intake amount regulating unit provided in the intake passage. The EGR apparatus includes an EGR passage and an electrically-operated EGR valve. The EGR valve includes a valve seat, a valve element, a motor, and others. In the intake passage downstream of the intake amount regulating unit, an intake pressure detecting unit is provided to detect intake pressure. The EGR apparatus is further provided with a load detecting unit to detect engine load. The failure detection device is provided with a failure determination unit for determining a failure of the EGR apparatus based on the intake pressure detected according to an operating state of the EGR valve when the engine is in a steady running state and a predetermined determination condition is satisfied. When the engine is in the steady running state and the predetermined determination condition is satisfied, the failure determination unit determines if the EGR valve is faulty (e.g., a foreign matter is lodged or jammed between the valve seat and the valve element) by comparing the intake pressure detected according to the operating state of the EGR valve and the determination intake pressure obtained according to the determination condition. The predetermined determination condition set herein is a condition that the detected engine load falls within a predetermined load range and the motor of the EGR valve is operated in a predetermined operation range.

SUMMARY

Technical Problem

However, in the failure detection device disclosed in Japanese Patent No. 6071799, the failure of the EGR apparatus is determined on the premise that running of the engine is steady and the predetermined determination condition is satisfied. Thus, the occasions for failure determination are limited. In this failure detection device, furthermore, the failure determination is made on the precondition that the predetermined load range is low-rotation light-load of an engine and the predetermined operating range is a small opening degree of the EGR valve. Therefore, the failure determination of the EGR apparatus may be influenced by various variations and disturbances (e.g., displacement of tappet clearance and valve timing, air density (temperature), PCV flow rate, electric load, etc.). To avoid those variations and disturbances, abnormality in the EGR valve at the small opening degree, such as lodging abnormality of a small-diameter foreign matter, could not be detected.

The present disclosure has been made to address the above problems and has a purpose to provide an EGR apparatus of an engine capable of early diagnosing abnormality in opening/closing of the EGR valve without limiting conditions related to a running state of the engine and an operating state of the EGR valve to specific conditions.

Means of Solving the Problem

To achieve the above-mentioned purpose, one aspect of the present disclosure provides an EGR apparatus of an engine, the EGR apparatus comprising: an EGR passage configured to allow part of exhaust gas discharged from the engine to an exhaust passage to flow as EGR gas from the exhaust passage to an intake passage in order to recirculate the EGR gas into the engine; an EGR valve configured to regulate a flow rate of the EGR gas in the EGR passage, the EGR valve including a valve seat, a valve element provided to be seatable on the valve seat, and an actuator to move the valve element; a running-state detecting unit configured to detect a running state of the engine; an EGR valve control unit configured to control the EGR valve based on the detected running state; and an EGR valve abnormality diagnosing unit configured to diagnose abnormality in opening/closing between the valve seat and the valve element of the EGR valve based on the detected running state, wherein the running-state detecting unit includes: an intake pressure detecting unit configured to detect intake pressure in the intake passage downstream of a position where the EGR gas flows from the EGR passage into the intake passage; a rotation speed detecting unit configured to detect a rotation speed of the engine; and a load detecting unit configured to detect a load of the engine, and the EGR valve abnormality diagnosing unit is configured to determine whether or not the EGR valve has the abnormality by comparing a reference intake pressure calculated based on the detected rotation speed and the detected load with the detected intake pressure or by comparing a reference opening degree of the EGR valve calculated based on the detected rotation speed, the detected load, and the detected intake pressure with a control opening degree of the EGR valve under control by the EGR valve control unit.

The present disclosure configured as above can early diagnose abnormality in opening/closing of the EGR valve without limiting the conditions related to a running state of the engine and an operating state of the EGR valve to specific conditions.

BRIEF DESCRIPTION OF THE DRAWING

FIG. 6 is a full-closing reference intake pressure for reference to similarly obtain the full-closing reference intake pressure during deceleration according to engine rotation speed and engine load in the first embodiment;

FIG. 10 is a first valve-opening reference intake pressure map for reference to similarly obtain the first valve-opening reference intake pressure during deceleration according to engine rotation speed and engine load in the second embodiment;

FIG. 24 is a misfire limit opening degree map for reference to obtain a misfire limit opening degree according to engine rotation speed and engine load in the sixth embodiment;

DETAILED DESCRIPTION OF THE EXEMPLARY EMBODIMENTS

First Embodiment

A detailed description of a first embodiment of an EGR apparatus of an engine of this disclosure embodied in a gasoline engine system will now be given referring to the accompanying drawings.

(Brief Overview of Gasoline Engine System)

Figure 1:
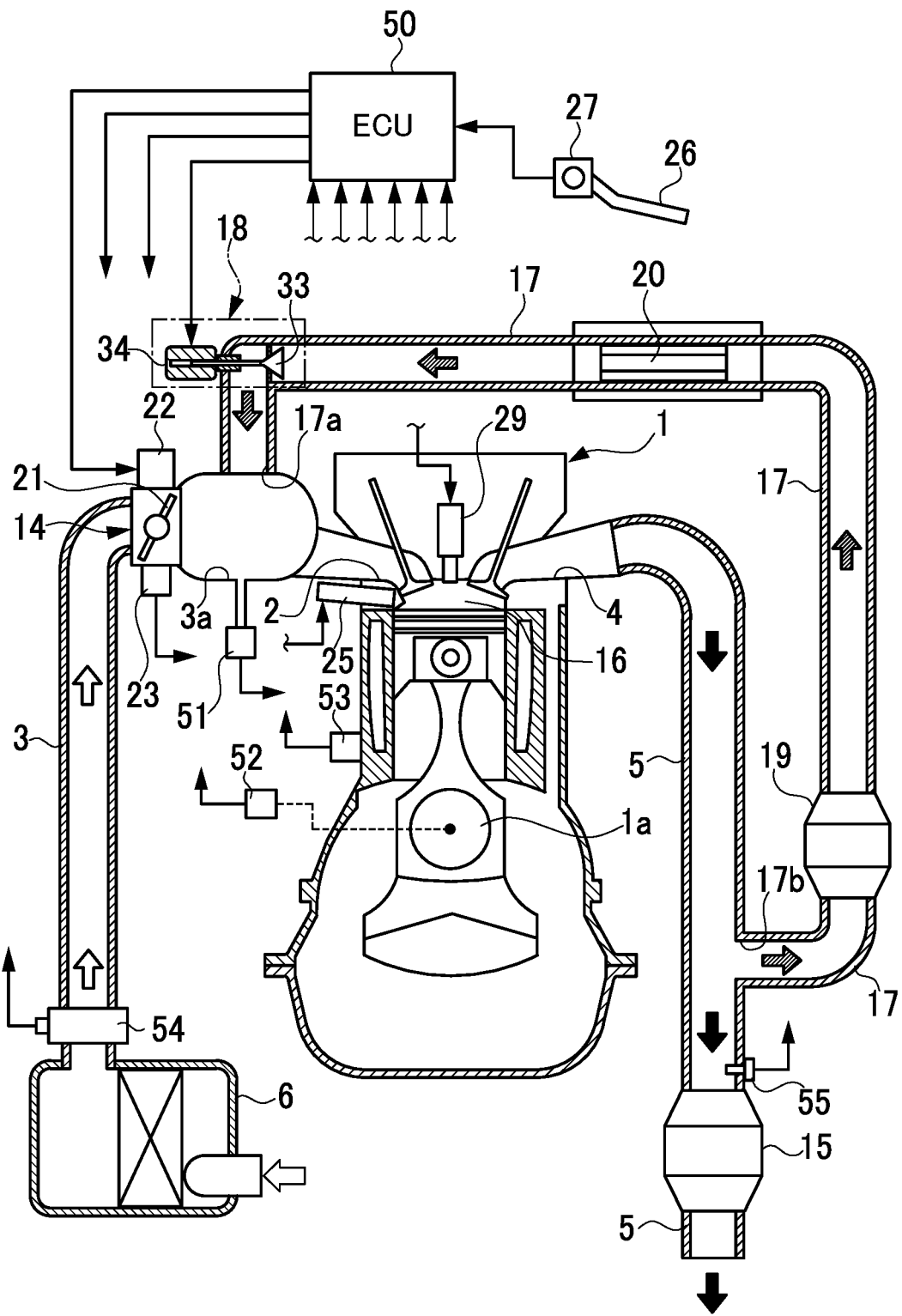
FIG. 1 is a schematic configuration diagram showing a gasoline engine system including an EGR apparatus of an engine in a first embodiment.

FIG. 1 is a schematic configuration view of a gasoline engine system including an EGR apparatus of an engine (hereinafter, simply referred to as "engine system") in the present embodiment. This engine system is provided with a reciprocating type engine 1. The engine 1 includes an intake port 2 connected to an intake passage 3 and an exhaust port 4 connected to an exhaust passage 5. In the entrance of the intake passage 3, an air cleaner 6 is provided.

In the intake passage 3, a surge tank 3 is provided and an electronic throttle device 14 is placed upstream of the surge tank 3a. This electronic throttle device 14 includes a throttle valve 21, a step motor 22 for driving the throttle valve 21 to open and close, and a throttle sensor 23 for detecting an opening degree (a throttle opening degree) TA of the throttle valve 21. The throttle device 14 is configured to drive the step motor 22 in response to the operation of an accelerator pedal 26 by a driver to adjust the opening degree of the throttle valve 21. The throttle sensor 23 corresponds to one example of a load detecting unit for detecting a throttle opening degree TA corresponding to the load of the engine 1. In the exhaust passage 5, a catalytic converter 15 is provided to purify exhaust gas.

In the engine 1, an injector 25 is provided to supply fuel by injection into a combustion chamber 16. The injector 25 is configured to be supplied with fuel from a fuel tank (not shown). In the engine 1, furthermore, an ignition device 29 is provided to ignite a mixed gas of fuel and intake air generated in the combustion chamber 16.

This engine system is provided with a high-pressure-loop EGR apparatus. This EGR apparatus includes an EGR passage 17 and an EGR valve 18. The EGR passage 17 is configured to allow part of exhaust gas discharged from the combustion chamber 16 of the engine 1 to the exhaust passage 5 to flow as EGR gas from the exhaust passage 5 to the intake passage 3 in order to recirculate the EGR gas into the combustion chamber 16. The EGR valve 18 is placed in the EGR passage 17 to regulate a flow rate of the EGR gas in the EGR passage 17. The EGR passage 17 is located between the exhaust passage 5 and the surge tank 3a of the intake passage 3. Specifically, an outlet 17a of the EGR passage 17 is connected to the surge tank 3a at a position downstream of the electronic throttle device 14. An inlet 17b of the EGR passage 17 is connected to the exhaust passage 5.

In the EGR passage 17, on its upstream side, a catalytic converter 19 for EGR is provided to purify the EGR gas. In the EGR passage 17, downstream of the EGR catalytic converter 19, an EGR cooler 20 is provided to cool the EGR gas flowing through the EGR passage 17. In the present embodiment, the EGR valve 18 is placed in the EGR passage 17 downstream of the EGR cooler 20.

(Configuration of EGR Valve)

Figure 2:
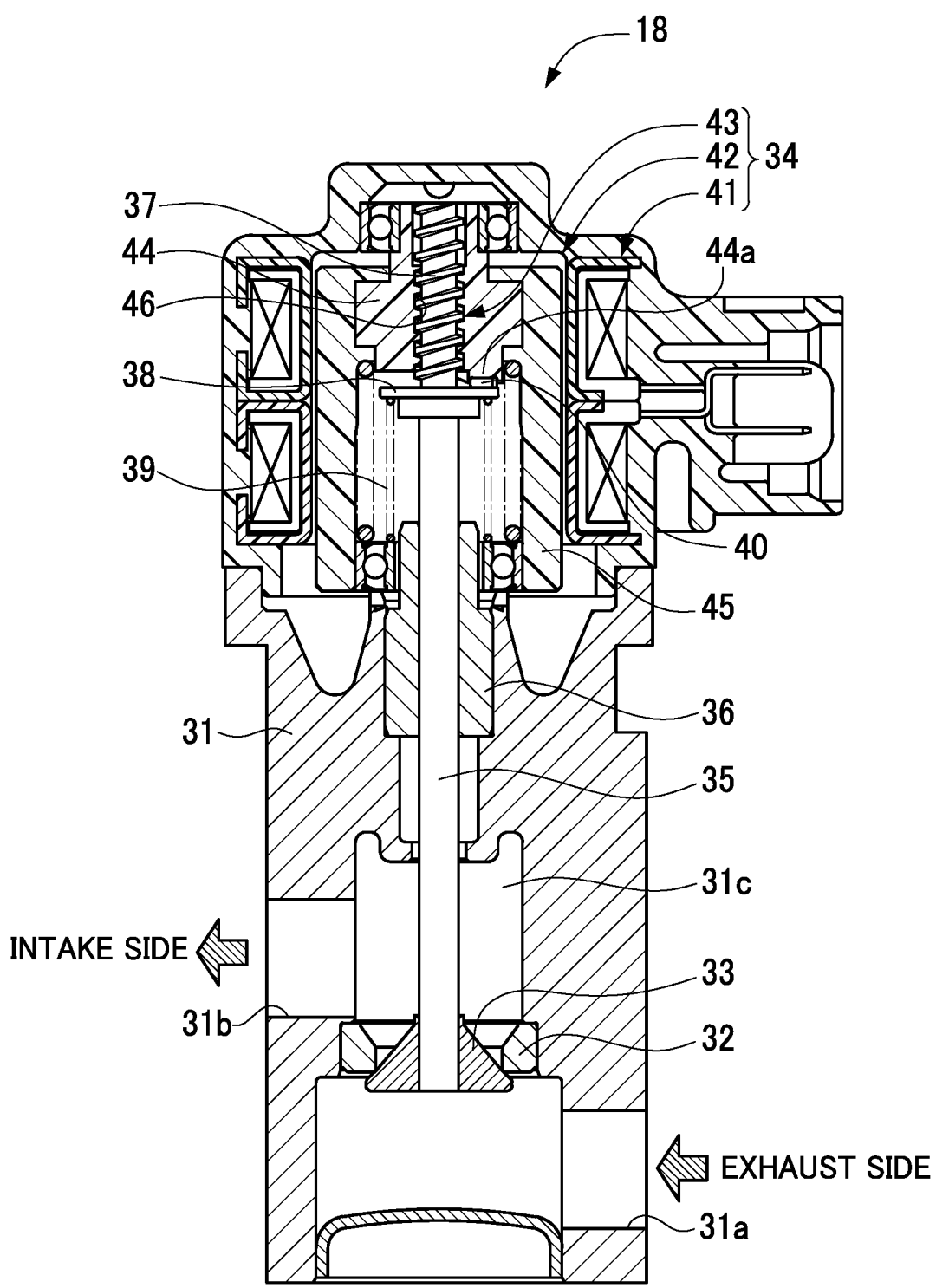
FIG. 2 is a cross sectional view showing a configuration of an EGR valve in the first embodiment.
Figure 3:
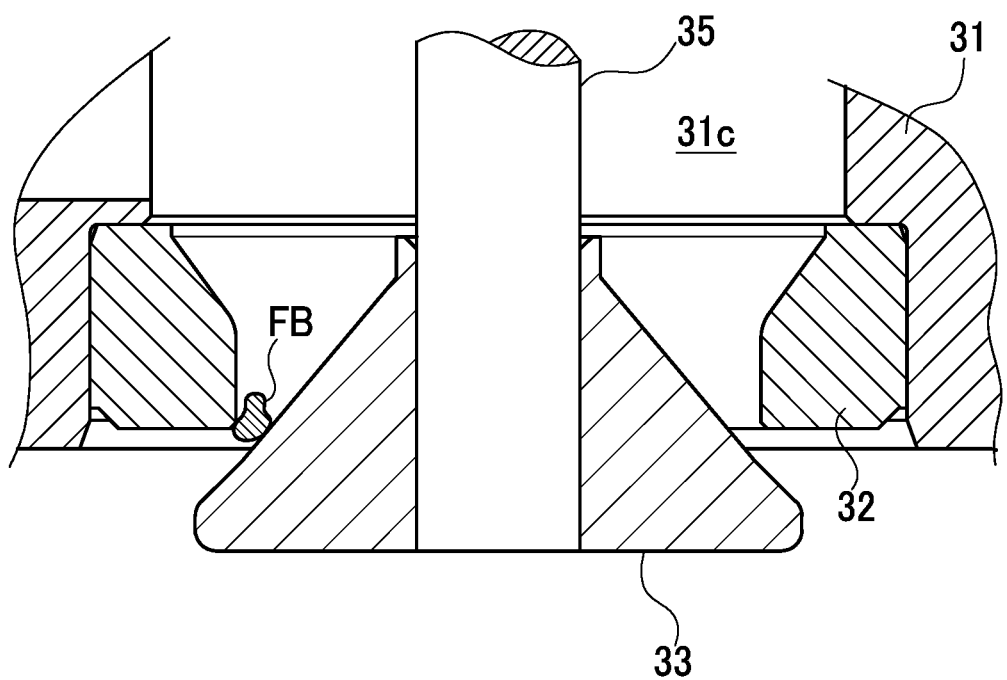
FIG. 3 is an enlarged cross-sectional view showing part of the EGR valve in the first embodiment.

FIG. 2 is a cross-sectional view showing the configuration of the EGR valve 18. FIG. 3 is an enlarged cross-sectional view of part of the EGR valve 18. As shown in FIG. 2, the EGR valve 18 is constituted of a poppet motor-operated valve. Specifically, the EGR valve 18 is provided with a housing 31, a valve seat 32 provided in the housing 31, a valve element 33 provided to be seatable on and movable with respect to the valve seat 32 in the housing 31, and a step motor 34 to make stroke movement of the valve element 33. The step motor 34 corresponds to one example of an actuator in the present disclosure. The housing 31 includes an inflow port 31a that allows EGR gas to flow in the EGR valve 18 from the exhaust passage 5 (an exhaust side), an outflow port 31b that allows EGR gas to flow out of the EGR valve 18 to the intake passage 3 (an intake side), and a communication passage 31c that allows communication between the inflow port 31a and the outflow port 31b. The valve seat 32 is placed in a predetermined position in the communication passage 31c.

The step motor 34 is provided with an output shaft 35 configured to perform linear reciprocating operation (stroke movement). At the distal end of this output shaft 35, the valve element 33 is fixed. The output shaft 35 is supported to enable stroke movement with respect to the housing 31 through a baring 36 provided in the housing 31. The output shaft 35 is formed, on its upper end portion, with a male screw section 37. The output shaft 35 is further formed, on its middle portion (near a lower end of the male screw section 37), with a spring retainer 38. The spring retainer 38 has a lower surface serving as a retaining surface for receiving a compression spring 39 and an upper surface formed with a stopper 40.

The valve element 33 has a conical shape with a conical surface configured to contact with or separate from the valve seat 32. When the valve element 33 contacts with the valve seat 32, the valve element 33 is fully closed. When the valve element 33 separates from the valve seat 32, the valve element is opened. The valve element 33 is urged toward the step motor 34, that is, in a valve closing direction to seat on the valve seat 32, by the compression spring 39 placed between the spring retainer 38 and the housing 31. As the valve element 33 in the fully closed position is stroke-moved by the output shaft 35 of the step motor 34 against the urging force of the compression spring 39, the valve element 33 separates (valve-opening) from the valve seat 32. During this valve opening, the valve element 33 is moved to the upstream side (the exhaust side) in the EGR passage 17. As described above, the EGR valve 18 comes into a valve-opened state in such a manner that the valve element 33 is moved from a fully closed position where the valve element 33 seats on the valve seat 32 toward the upstream side in the EGR passage 17 against the exhaust pressure or intake pressure of the engine 1, so that the valve element 33 separates from the valve seat 32. On the other hand, from the valve-opened state, the EGR valve 18 comes into a valve-closed state in such a manner that the valve element 33 is moved by the output shaft 35 of the step motor 34 in the urging direction of the compression spring 39, so that the valve element 33 moves closer to the valve seat 32. During this valve closing operation, the valve element 33 is moved toward the downstream side (the intake side) in the EGR passage 17.

In the present embodiment, the opening degree of the valve element 33 with respect to the valve seat 32 is adjusted by the stroke movement of the output shaft 35 of the step motor 34. The output shaft 35 of the EGR valve 18 is provided to enable stroke movement by a predetermined stroke from the fully closed position of the valve element 33 seating on the valve seat 32 to a fully opened position of the valve element 33 separated at a maximum distance from the valve seat 32.

The step motor 34 includes a coil, 41, a magnet rotor 42, and a converting mechanism 43. The step motor 34 is configured such that when the coil 41 is excited by energization, the magnet rotor 42 is rotated by the predetermined number of motor steps, and the converting mechanism 43 converts the rotary movement of the magnet rotor 42 to the stroke movement of the output shaft 35. In association with this stroke movement of the output shaft 35, the valve element 33 is stroke-moved with respect to the valve seat 32.

The magnet rotor 42 includes a rotor body 44 made of resin and a ring-shaped plastic magnet 45. The rotor body 44 is formed, on its center, with a female screw section 46 which engages with the male screw section 37 of the output shaft 35. When the rotor body 44 is rotated while the female screw section 46 of the rotor body 44 engages with the male screw section 37 of the output shaft 35, the rotary movement of the rotor body 44 is converted to the stroke movement of the output shaft 35. Herein, the male screw section 37 and the female screw section 46 constitute the foregoing converting mechanism 43. The rotor body 44 is formed, in its lower part, with a contact portion 44a on which the stopper 40 of the spring retainer 38 can contact. During full closing of the EGR valve 18, the end face of the stopper 40 is surface contact with the end face of the contact portion 44a, thereby restricting the initial position of the output shaft 35.

In the present embodiment, the number of motor steps of the step motor 34 is stepwise changed to stepwise adjust the opening degree of the valve element 33 of the EGR valve 18 in small steps from full close to fill open.

(Electrical Configuration of Engine System)

In the present embodiment, an electronic control unit (ECU) 50 is provided to execute each of fuel injection control, ignition timing control, intake amount control, EGR control, and others according to a running state of the engine 1. The ECU 50 is configured to individually control the injector 25, the ignition device 29, the step motor 22 of the electronic throttle device 14, and the step motor 34 of the EGR valve 18. The ECU 50 is provided with a central processing unit (CPU), various memories which store predetermined control programs and others in advance or temporarily store calculation results and others of the CPU, and an external input circuit and an external output circuit each connected to each of the above parts. The ECU 50 corresponds to one example of an ECR-valve control unit, an EGR-valve abnormality diagnosing unit, and a foreign-matter removal control unit in the present disclosure. The external output circuit is connected to the injector 25, the ignition device 29, and the step motors 22 and 34. The external input circuit is connected to the throttle sensor 23 and various sensors 27 and 51 to 55 for detecting the running state of the engine 1. These various sensors 23, 27, and 51 to 55 correspond to one example of a running-state detecting unit in the present disclosure. The ECU 50 is further configured to output a predetermined command signal to the step motor 34 in order to control the EGR valve 18.

Herein, the various sensors include, in addition to the throttle sensor 23, an accelerator sensor 27, an intake pressure sensor 51, a rotation speed sensor 52, a water temperature sensor 53, an airflow meter 54, and an air-fuel ratio sensor 55. The accelerator sensor 27 is configured to detect an accelerator opening degree ACC which is an operation amount of the accelerator pedal 26 and output a detection signal thereof. The accelerator pedal 26 corresponds to one example of an operation unit for operating the output of the engine 1. The intake pressure sensor 51 is configured to detect an intake pressure PM in the surge tank 3a downstream of the electronic throttle device 14 and output a detection signal thereof. The intake pressure sensor 51 corresponds to one example of an intake pressure detecting unit in the present disclosure. The rotation speed sensor 52 is configured to detect a rotation angle of a crank shaft 1a of the engine 1 (crank angle) and also detect changes of the crank angle as a rotation speed of the engine 1 (engine rotation angle), and output a detection signal thereof. The rotation speed sensor 52 corresponds to one example of a rotation speed detecting unit in the present disclosure. The water temperature sensor 53 is configured to detect a cooling-water temperature THW of the engine 1 and output a detection signal thereof. The airflow meter 54 is configured to detect an intake amount Ga of air flowing through the intake passage 3 directly downstream of the air cleaner 6 and output a detection signal thereof. The air-fuel ratio sensor 55 is configured to detect an air-fuel ratio A/F in the exhaust gas in the exhaust passage 5 directly upstream of the catalytic converter 15 and output a detection signal thereof.

In the present embodiment, the ECU 50 is configured to control the EGR valve 18 in order to control EGR according to the running state of the engine 1 in the entire operation range of the engine 1. In contrast, during deceleration of the engine 1 and cutoff of fuel supply to the engine 1 (during deceleration fuel cut), the ECU 50 is configured to control the EGR valve 18 to fully close in order to shut off a flow of EGR gas.

In the EGR valve 18 in the present embodiment, as shown in FIG. 3, there may occur some troubles such as lodging or sticking of a foreign matter FB such as a deposit between the valve seat 32 and the valve element 33. In the EGR apparatus in the present embodiment, therefore, the ECU 50 is configured to execute "EGR-valve foreign matter lodging diagnostic control" to diagnose the abnormality in opening/closing of the EGR valve 18 including lodging of a foreign matter FB between the valve seat 32 and the valve element 33. In the present embodiment, "EGR-valve foreign matter removal control" is performed to remove the foreign matter FB lodged between the valve seat 32 and the valve element 33.

(EGR-valve Foreign Matter Lodging Diagnostic Control)

Figure 4:
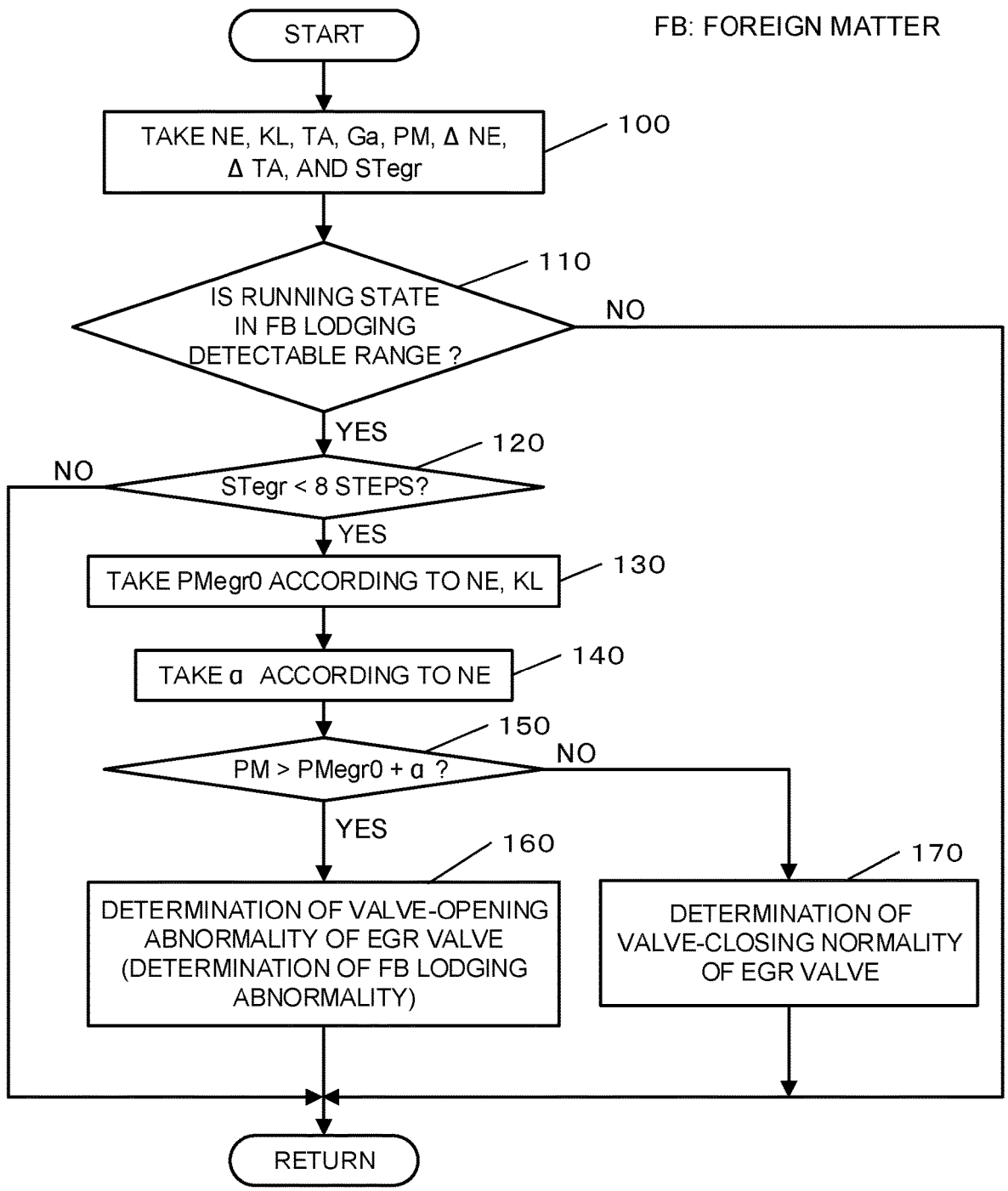
FIG. 4 is a flowchart showing processing contents of EGR-valve foreign matter lodging diagnostic control in the first embodiment.

FIG. 4 is a flowchart showing one example of processing contents in the EGR-valve foreign matter lodging diagnostic control to be implemented by the ECU 50. This flowchart shows the processing contents to determine whether or not the EGR valve 18 has abnormality due to foreign matter lodging when the engine 1 is in deceleration and the ECU 50 controls the EGR valve 18 to fully close to a fully-closed state (Fully-closing control) or to close to the valve-closed state, i.e., to a predetermined opening degree (Valve-closing control).

When the processing enters this routine, firstly in Step 100, the ECU 50 takes various signals representing the running state of the engine 1 from the various sensors 23, 51, 52, and 54. Specifically, the ECU 50 individually takes engine rotation speed NE, engine load KL, throttle opening degree TA, intake amount Ga, intake pressure PM, engine rotation change $\Delta$NE and throttle opening degree change $\Delta$TA, and the number of motor steps ("motor step number") STegr of the step motor 34 corresponding to a control opening degree of the EGR valve 18. Herein, the ECU 50 can obtain the engine load KL based on the throttle opening degree TA or the intake pressure PM. The ECU 50 can obtain a change of the throttle opening degree TA per unit time as the throttle opening degree change $\Delta$TA. The ECU 50 can obtain a change of the engine rotation speed NE per unit time as the engine rotation change $\Delta$NE. Herein, the motor step number STegr is proportional to the control opening degree of the EGR valve 18 (an EGR opening degree), that is, the opening degree of the valve element) 33 with respect to the valve seat 32.

In Step 110, the ECU 50 determines whether or not the running state of the engine 1 falls within a range that can detect lodging of a foreign matter ("foreign-matter lodging detectable range"). For instance, the ECU 50 can judge whether or not the range defined based on a relationship between the engine rotation speed NE and the engine load KL falls within a predetermined range appropriate for detection of foreign matter lodging. This predetermined range includes deceleration operation or steady operation of the engine 1. If this determination result is affirmative (YES in Step 110), the ECU 50 advances the processing to Step 120. If this determination result is negative (NO in Step 110), the ECU 50 returns the processing to Step 100.

In Step 120, the ECU 50 determines whether or not the motor step number STegr is smaller than 8 steps. This reference value, 8 steps, is one example and corresponds to a minute opening degree of the EGR valve 18. If YES in Step 120, the ECU 50 shifts the processing to Step 130. If NO in Step 120, the ECU 50 returns the processing to Step 100.

Figure 5:
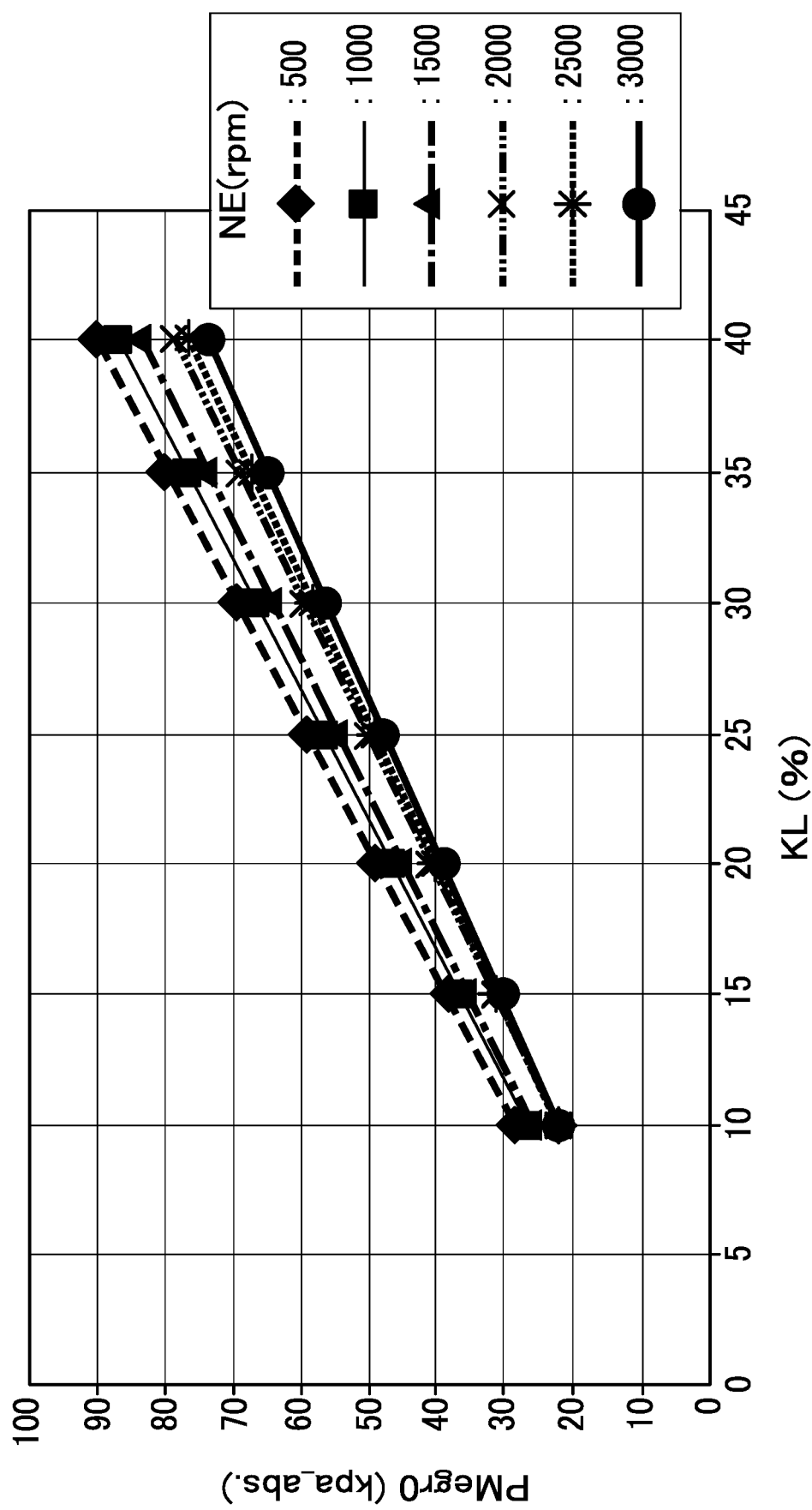
FIG. 5 is a Rill-closing reference intake pressure map for reference to obtain full-closing reference intake pressure during deceleration according to engine rotation speed and engine load in the first embodiment.

In Step 130, the ECU 50 takes full-closing reference intake pressure PMegr0 during deceleration corresponding to the engine rotation speed NE and the engine load KL. The ECU 50 can obtain this full-closing reference intake pressure PMegr0 during deceleration according to the rotation speed NE and the engine load KL for example by reference to a full-closing reference intake pressure map previously set as shown in FIGS. 5 and 6. This full-closing reference intake pressure map is a map previously set to show a relationship of the full-closing reference intake pressure PMegr0 to the engine rotation speed NE and the engine load KL when the opening degree of the valve element 33 of the EGR valve 18 is 0, that is, during full closing, and corresponds to one example of a reference function map in the present disclosure. In general, the intake pressure PM during deceleration of the engine 1 correlates with the engine load KL irrespective of the presence/absence of a lodged foreign matter in the EGR valve 18. The intake pressure PM and the engine load KL are almost proportional to each other. However, since the intake pressure PM changes according to the engine rotation speed NE, the full-closing reference intake pressure PMegr0 is set with respect to the engine rotation speed NE and the engine load KL in FIGS. 5 and 6.

In Step 140, subsequently, the ECU 50 takes a pressure increase allowance according to the engine rotation speed NE. The ECU 50 can obtain this pressure increase allowance a by reference to a predetermined map that has been previously set. This pressure increase allowance a is a value to be added to the full-closing reference intake pressure PMegr0 to allow an error or the like in the determination mentioned later.

In Step 150, the ECU 50 then determines whether or not the detected intake pressure PM is larger than an addition result obtained by adding the pressure increase allowance a to the full-closing reference intake pressure PMegr0. If YES in Step 150, the ECU 50 advances the processing to Step 160. If NO in Step 150, the ECU 50 shifts the processing to Step 170.

In Step 160, the ECU 50 determines that the EGR valve 18 has valve-opening abnormality (i.e., the EGR valve 18 is in an abnormal state because it is opened even though subjected to the fully-closing control), that is, judges that the abnormality is due to lodging of foreign matter and thus returns the processing to Step 100. The ECU 50 can store this determination result in a memory or execute a predetermined abnormality informing control in response to this determination result.

In Step 170, on the other hand, the ECU 50 determines that the EGR valve 18 is in valve-closing normality (i.e., the EGR valve 18 is in a normal state because it is closed to the fully-closed state) and thus returns the processing to Step 100.

According to the foregoing EGR-valve foreign matter lodging diagnostic control, the ECU 50 is configured to compare the full-closing reference intake pressure PMegr0 (the reference intake pressure) calculated based on the detected engine rotation speed NE and the detected engine load KL with the detected intake pressure PM and thereby determine the present or absence of abnormality in opening/closing between the valve seat 32 and the valve element 33 of the EGR valve 18 (abnormality in opening/closing of the EGR valve 18).

More specifically, the ECU 50 is provided with the full-closing reference intake pressure map (the reference function map) previously set to show the relationship of the full-closing reference intake pressure PMegr0 (the reference intake pressure) to the engine rotation speed NE and the engine load KL. The ECU 50 calculates the full-closing reference intake pressure PMegr0 according to the detected engine rotation speed NE and the detected engine load KL by reference to the above map and determines whether or not the EGR valve 18 has abnormality in opening/closing by comparing the calculated full-closing reference intake pressure PMegr0 with the detected intake pressure PM.

According to the foregoing EGR-valve foreign matter lodging diagnostic control, when the engine 1 is in deceleration and the ECU 50 controls the EGR valve 18 to close to the fully-closed state or the valve-closed state, the ECU 50 is configured to compare the obtained full-closing reference intake pressure PMegr0 with the detected intake pressure PM and thereby determine whether or not the EGR valve 18 has abnormality in opening/closing.

(EGR-Valve Foreign Matter Removal Control)

Figure 7:
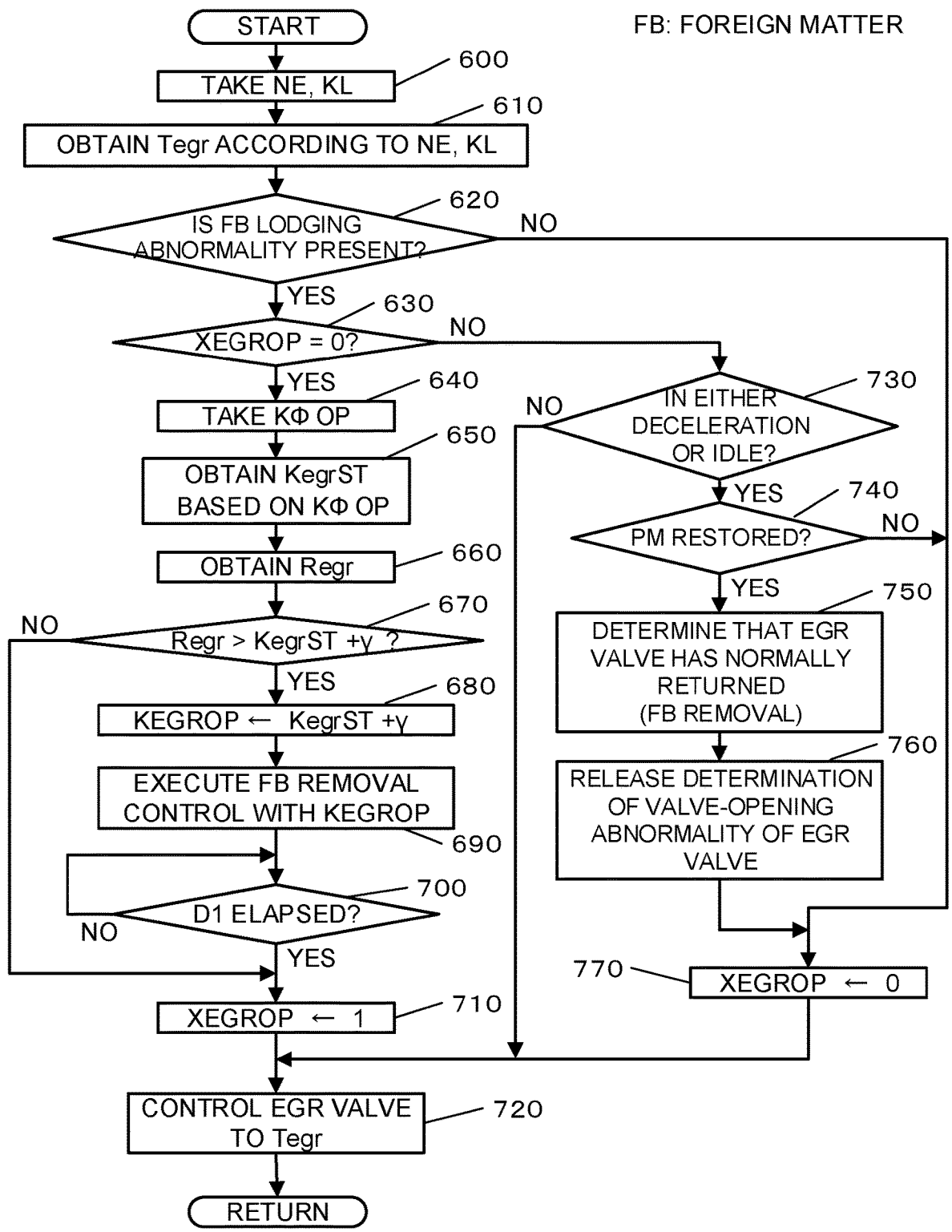
FIG. 7 is a flowchart showing processing contents of EGR-valve foreign matter removal control in the first embodiment.

The following description is given to the EGR-valve foreign matter removal control to be executed in response to the result of the foregoing EGR-valve foreign matter lodging diagnostic control. FIG. 7 is a flowchart showing one example of the processing contents.

When the processing enters this routine, in Step 600, the ECU 50 individually takes the engine rotation speed NE and the engine load KL based on detection values of the rotation speed sensor 52, the throttle sensor 23, and others.

In Step 610, the ECU 50 then obtains a target EGR opening degree Tegr of the EGR valve 18 according to the engine rotation speed NE and the engine load KL. The ECU 50 can obtain this target EGR opening degree Tegr according to the engine rotation speed NE and the engine load KL for example by reference to a predetermined target EGR opening degree map.

In Step 620, the ECU 50 determines whether or not the foreign matter lodging abnormality is present. The ECU 50 can make this determination based on the determination result of the foregoing EGR-valve foreign matter lodging diagnostic control. If YES in Step 620, the ECU 50 advances the processing to Step 630. If NO in Step 620, the ECU 50 shifts the processing to Step 770.

In Step 630, the ECU 50 determines whether a foreign-matter removal flag XEGROP is 0 or not. This flag XEGROP is set to 1 when the removal control for removing a foreign matter lodged in the EGR valve 18 (Foreign-matter removal control) is performed as mentioned later. If YES in Step 630, the ECU 50 advances the processing to Step 640. If NO in Step 630, the ECU shifts the processing to Step 730.

In Step 640, the ECU 50 takes a foreign-matter diameter equivalent ratio KΦOP, which corresponds to the diameter of a foreign matter. The ECU 50 can obtain this foreign-matter diameter equivalent ratio KΦOP by dividing the intake pressure PM detected in the foreign matter lodging determination by an intake pressure in a normal state of the EGR valve 18 (the full-closing reference intake pressure PMegr0 obtained based on the relationship between the engine rotation speed NE and the engine load KL).

In Step 650, the ECU 50 obtains an EGR opening degree KegrST equivalent to the diameter of a foreign matter (namely, a foreign-matter diameter equivalent opening degree) based on the foreign-matter diameter equivalent ratio KΦOP. The ECU 50 can obtain this foreign-matter diameter equivalent opening degree KegrST according to the foreign-matter diameter equivalent ratio KΦOP for example by reference to a predetermined foreign-matter diameter equivalent opening degree map.

In Step 660, the ECU 50 obtains a real EGR opening degree Regr of the EGR valve 18 (a real EGR opening degree). The ECU 50 can obtain this real EGR opening degree Regr corresponding to the motor step number STegr of the step motor 34 for example by reference to a predetermined real EGR opening degree map.

In Step 670, the ECU 50 determines whether or not the real EGR opening degree Regr is larger than an addition result obtained by adding a predetermined value γ to the foreign-matter diameter equivalent opening degree KegrST. This predetermined value γ is a constant value to be added to control the EGR valve 18 to a larger opening degree than the foreign-matter diameter equivalent opening degree KegrST. If YES in Step 670, the ECU 50 advances the processing to Step 680. If NO in Step 670, the ECU 50 shifts the processing to Step 710.

In Step 680, the ECU 50 sets the addition result obtained by adding the predetermined value γ to the foreign-matter diameter equivalent opening degree KegrST as a foreign-matter removal opening degree KEGROP to remove the foreign matter FB from the EGR valve 18.

In Step 690, the ECU 50 executes the foreign-matter removal control with the foreign-matter removal opening degree KEGROP. Specifically, the ECU 50 controls the EGR valve 18 to open from the real EGR opening degree Regr to the foreign-matter removal opening degree KEGROP. In this case, lodging of the foreign matter FB between the valve seat 32 and the valve element 33 is released, so that the foreign matter FB is peeled or blown away from the valve seat 32 or the valve element 33 by a flow of EGR gas in the EGR passage 17.

In Step 700, subsequently, the ECU 50 waits until a predetermined time D1 is elapsed and then shifts the processing to Step 710.

In Step 710 following Step 670 or 700, the ECU 50 sets the foreign-natter removal flag XEGROP to 1.

In Step 720, the ECU 50 controls the EGR valve 18 to the target EGR opening degree Tegr and further returns the processing to Step 600.

In Step 770 following Step 620, on the other hand, the ECU 50 sets the foreign-matter removal flag XEGROP to 0 and shifts the processing to Step 720.

In Step 730 following Step 630, the ECU 50 determines whether or not the engine 1 is in either deceleration or idle. The ECU 50 can make this determination for example based on the throttle opening degree TA and the engine rotation speed NE. If YES in Step 730, the ECU 50 advances the processing to Step 740. If NO in Step 730, the ECU 50 shifts the processing to Step 720.

In Step 740, the ECU 50 determines whether or not the intake pressure PM has restored to the intake pressure in the normal state of the EGR valve 18 (the full-closing reference intake pressure PMegr0 which can be obtained based on the relationship between the engine rotation speed NE and the engine load KL). If YES in Step 740, the ECU 50 advances the processing to Step 750. If NO in Step 740, the ECU 50 shifts the processing to Step 770.

In Step 750, the ECU 50 determines that the EGR valve 18 has normally returned (Normal return) since the foreign matter has been removed. The ECU 50 can store this determination result in the memory.

In Step 760, the ECU 50 releases the valve-opening abnormality determination on the EGR valve 18 and shifts the processing to Step 770. For instance, the ECU 50 can delete the valve-opening abnormality determination result stored in the memory.

According to the foregoing EGR-valve foreign matter removal control, when it is determined that the EGR valve 18 has the valve-opening abnormality (foreign matter lodging abnormality), the ECU 50 obtains the opening degree corresponding to the diameter of the foreign matter FB lodged between the valve seat 32 and the valve element 33 (the foreign-matter diameter equivalent opening degree KegrST) based on the detected intake pressure PM and the calculated full-closing reference intake pressure PMegr0 (the reference intake pressure). Further, for the purpose of removing the foreign matter FB from between the valve seat 32 and the valve element 33, the ECU 50 executes the foreign-matter removal control that controls the step motor 34 to open the valve element 33 at a larger opening degree (the foreign-matter removal opening degree KEGROP) than an opening degree corresponding to the obtained diameter of the foreign matter FB.

According to the configuration of the EGR apparatus of the engine in the present embodiment described above, during running of the engine 1, by reference to the full-closing reference intake pressure map (the reference function map) previously set to show the relationship of the full-closing reference intake pressure PMegr0 (the reference intake pressure) to the engine rotation speed NE and the engine load KL when the opening degree of the valve element 33 with respect to the valve seat 32 of the EGR valve 18 is 0, the full-closing reference intake pressure PMegr0 according to the detected engine rotation speed NE and the detected engine load KL is calculated. It is further determined whether or not the EGR valve 18 has the abnormality in opening/closing by comparing the calculated full-closing reference intake pressure PMegr0 and the detected intake pressure PM. Thus, since the full-closing reference intake pressure PMegr0 corresponding to various running states of the engine 1 is obtained by reference to the full-closing reference intake pressure map, it is not necessary for diagnosis of abnormality in opening/closing of the EGR valve 18 to limit the running state of the engine 1 to a specific condition, such as a sonic condition, and not necessary to limit the operating state of the EGR valve 18 to a specific condition. The present embodiment especially describes the determination of the presence/absence of abnormality in opening/closing of the EGR valve 18 during deceleration of the engine 1. However, not limited to during deceleration, the determination of the presence/absence of abnormality in opening/closing of the EGR valve 18 may also be performed in the steady operation of the engine 1. Therefore, it is possible to early diagnose abnormality of the EGR valve 18 in opening/closing without limiting the conditions on the running state of the engine 1 and the operating state of the EGR valve 18 to specific conditions.

According to the configuration of the present embodiment, when the engine 1 is in deceleration and the EGR valve 18 is subjected to the fully-closing control or to the valve-closing control, it is determined whether or not the EGR valve 18 has the abnormality in opening/closing by comparing the calculated full-closing reference intake pressure PMegr0 (the reference intake pressure) and the detected intake pressure PM. Accordingly, when there is a certain difference between the full-closing reference intake pressure PMegr0 and the intake pressure PM, it is determined that the abnormality is present in the EGR valve 18. Even when the intake pressure PM somewhat changes, therefore, the presence or absence of the abnormality in opening/closing of the EGR valve 18 can be relatively accurately determined.

In the present embodiment, the abnormality in opening/closing of the EGR valve 18 is assumed as full-closing abnormality that the EGR valve 18 cannot be fully closed due to lodging of the foreign matter FB. However, it may also be assumed as abnormality due to other reasons such as sticking of the valve element 33, not limited to due to lodging of the foreign matter FB.

According to the configuration of the present embodiment, when the EGR valve 18 has the foreign matter lodging abnormality, the valve element 33 is caused to open at a larger opening degree than an opening degree corresponding to the diameter of the foreign matter FB, thereby removing the foreign matter FB lodged between the valve seat 32 and the valve element 33. This configuration can quickly return the EGR valve 18 from the foreign matter lodging abnormality state to the normal state, thus avoiding the occurrence of misfire or engine stalling of the engine 1.

Second Embodiment

Next, a second embodiment of an EGR apparatus of an engine embodied in a gasoline engine will be described in detail with reference to the accompanying drawings.

In the following description, identical or similar components to those in the first embodiment are assigned the same reference signs and their details are omitted. Differences from the first embodiment will be mainly described.

Figure 8:
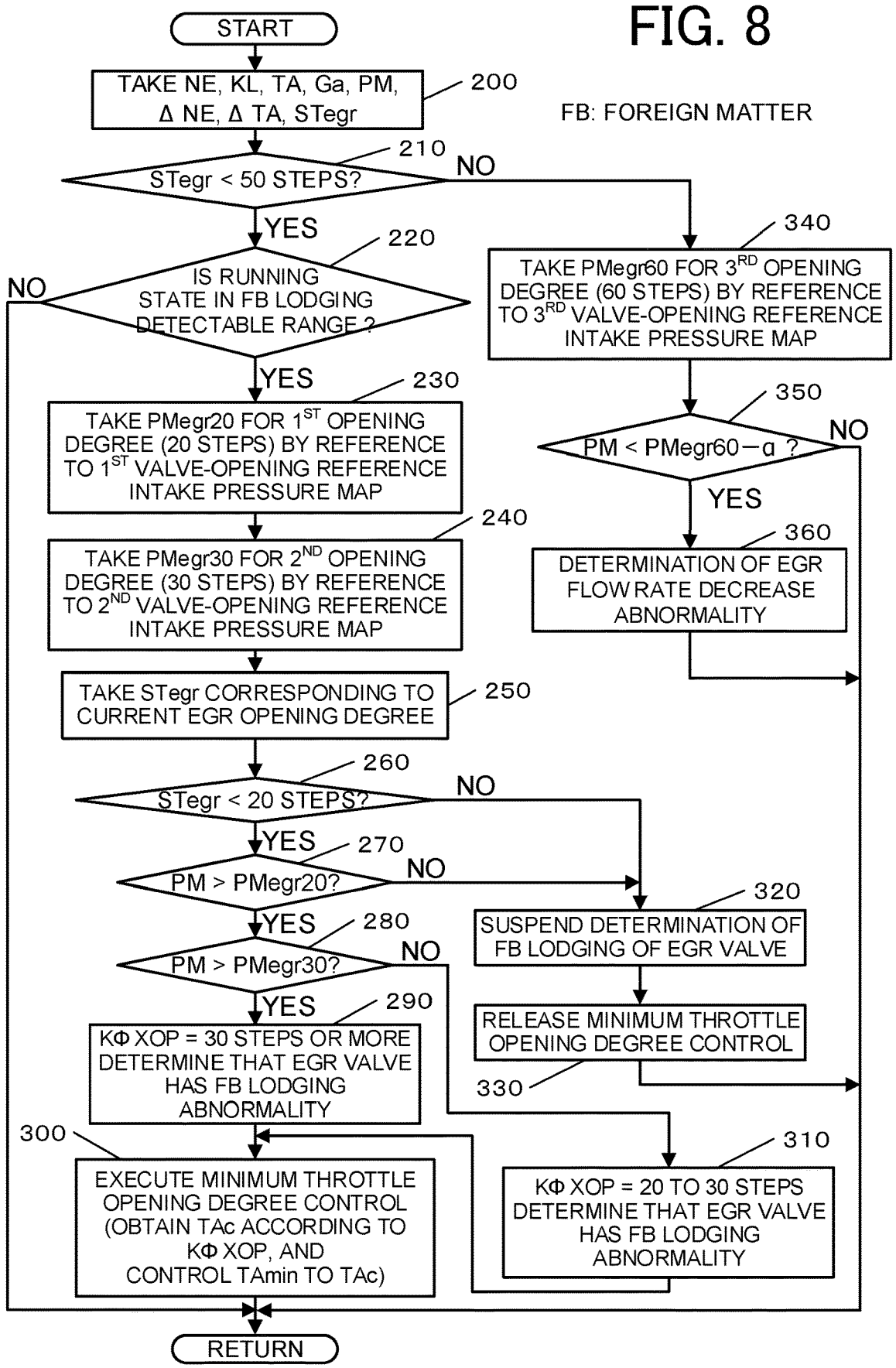
FIG. 8 is a flowchart showing processing contents of EGR-valve foreign matter lodging diagnostic control in a second embodiment.

The present embodiment differs from the first embodiment in the contents of the EGR-valve foreign matter lodging diagnostic control. FIG. 8 is a flowchart showing the control contents.

(EGR-Valve Foreign Matter Lodging Diagnostic Control)

When the processing enters this routine, firstly in Step 200, the ECU 50 individually takes engine rotation speed NE, engine load KL, throttle opening degree TA, intake amount Ga, intake pressure PM, throttle opening degree change ΔTA, engine rotation change ΔNE, and motor step number STegr. The processing contents in this Step 200 are the same as those in Step 100 in FIG. 4.

In Step 210, the ECU 50 determines whether or not the motor step number STegr corresponding to the control opening degree of the EGR valve 18 is smaller than 50 steps. This value, 50 steps, is one example and determined on the assumption of a certain opening degree of the EGR valve 18. If YES in Step 210, the ECU 50 advances the processing to Step 220. If NO in Step 210, the ECU 50 shifts the processing to Step 340.

In Step 220, the ECU 50 determines whether or not the running state of the engine 1 falls within the foreign-matter lodging detectable range. The processing contents in this Step 220 are the same as those in Step 110 in FIG. 4. If YES in Step 220, the ECU 50 advances the processing to Step 230. If NO in Step 220, the ECU 50 returns the processing to Step 200.

Figure 9:
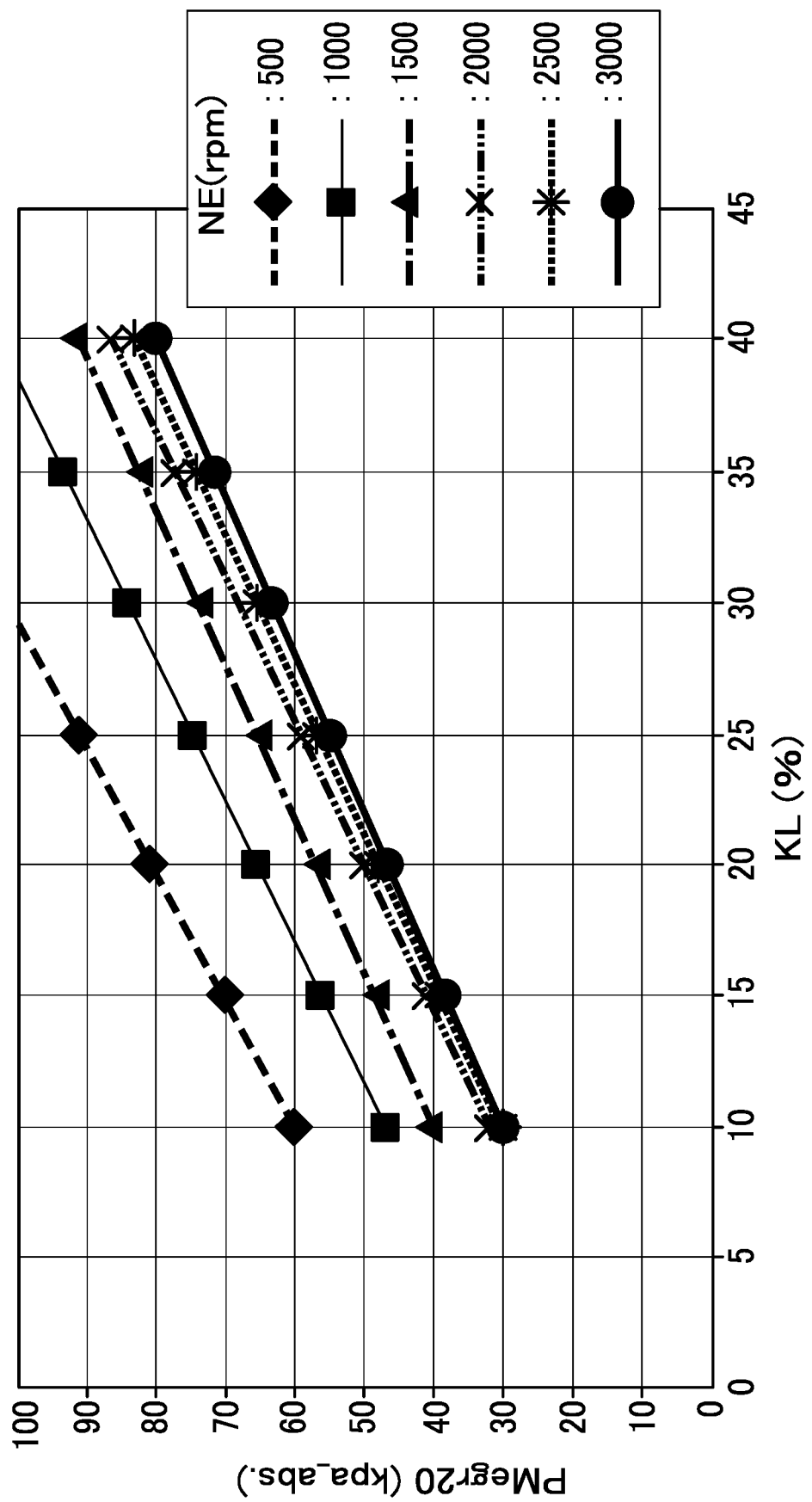
FIG. 9 is a first valve-opening reference intake pressure map for reference to obtain first valve-opening reference intake pressure during deceleration according to engine rotation speed and engine load in the second embodiment.

In Step 230, the ECU 50 takes a first valve-opening reference intake pressure PMegr20 for a first EGR opening degree (20 steps) by reference to a first valve-opening reference intake pressure map. This value, 20 steps, is one example and determined on the assumption of a certain opening degree of the EGR valve 18 (smaller than the opening degree corresponding to 50 steps). The ECU 50 can obtain the first valve-opening reference intake pressure PMegr20 according to the engine rotation speed NE and the engine load KL for example by reference to the first valve-opening reference intake pressure map previously set as shown in FIGS. 9 and 10. The first valve-opening reference intake pressure maps shown in FIGS. 9 and 10 are set in advance to show the relationship of the first valve-opening reference intake pressure PMegr20 to the engine rotation speed NE and the engine load KL when the opening degree of the valve element 33 with respect to the valve seat 32 of the EGR valve 18 (i.e., the first EGR opening degree corresponding to 20 steps) is 0. This first valve-opening reference intake pressure map corresponds to one example of a reference function map in the present disclosure.

Figure 11:
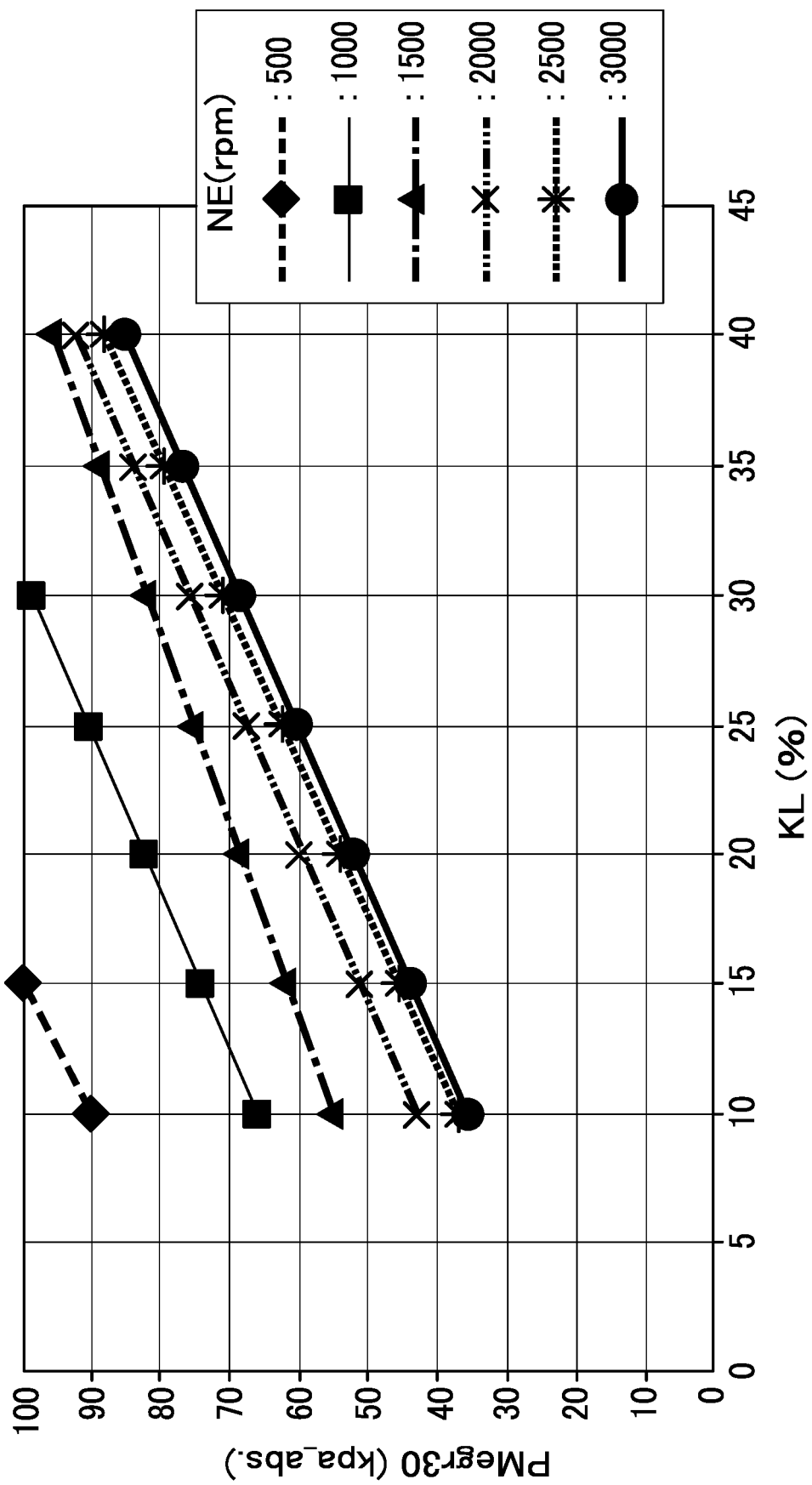
FIG. 11 is a second valve-opening reference intake pressure map for reference to obtain second valve-opening reference intake pressure during deceleration according to engine rotation speed and engine load in the second embodiment.
Figure 12:
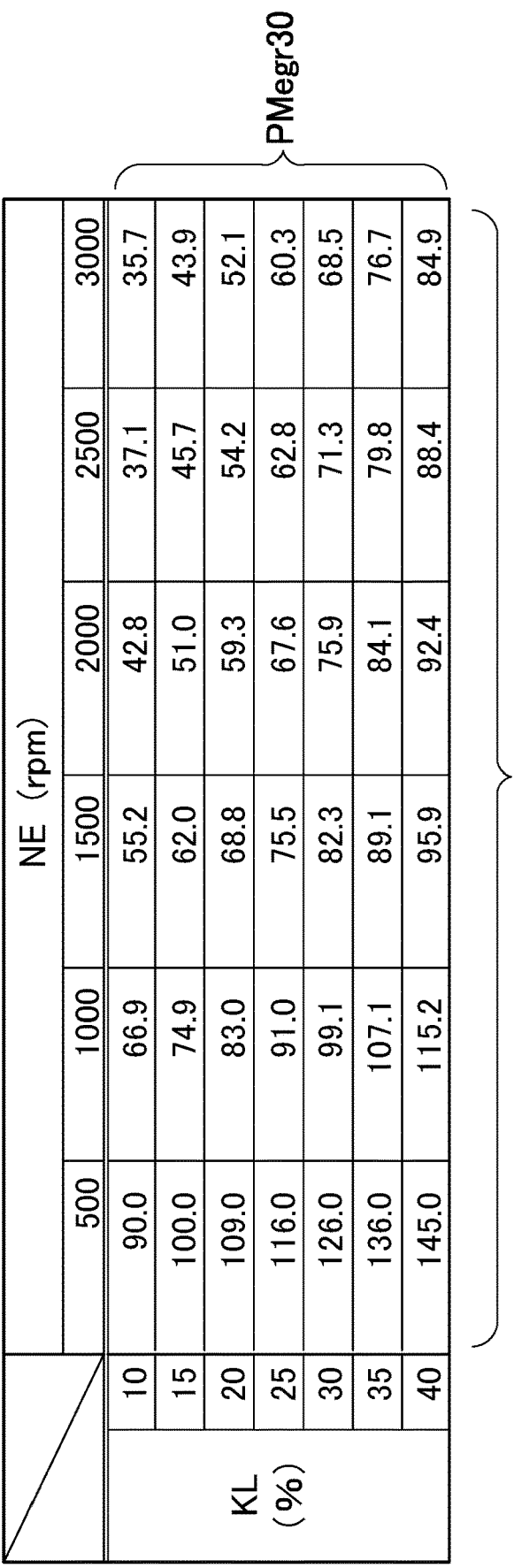
FIG. 12 is a second valve-opening reference intake pressure map for reference to similarly obtain the second valve-opening reference intake pressure during deceleration according to engine rotation speed and engine load in the second embodiment.

In Step 240, successively, the ECU 50 takes a second valve-opening reference intake pressure PMegr30 for a second EGR opening degree (30 steps) by reference to a second valve-opening reference intake pressure map. This value, 30 steps, is one example and determined on the assumption of a certain opening degree of the EGR valve 18 (larger than the opening degree corresponding to 20 steps). The ECU 50 can obtain the second valve-opening reference intake pressure PMegr30 according to the engine rotation speed NE and the engine load KL for example by reference to the second valve-opening reference intake pressure map previously set as shown in FIGS. 11 and 12. The second valve-opening reference intake pressure map shown in FIGS. 11 and 12 are set in advance to show the relationship of the second valve-opening reference intake pressure PMegr30 to the engine rotation speed NE and the engine load KL when the opening degree of the valve element 33 with respect to the valve seat 32 of the EGR valve 18 (i.e., the second EGR opening degree corresponding to 30 steps) is 0. This second valve-opening reference intake pressure map corresponds to one example of the reference function map in the present disclosure.

in Step 250, the ECU 50 takes the motor step number STegr corresponding to a current EGR opening degree (the control opening degree).

In Step 260, the ECU 50 determines whether or not the taken motor step number STegr is smaller than 20 steps. If YES in Step 260, the ECU 50 advances the processing to Step 270. If NO in Step 260, the ECU 50 shifts the processing to Step 320.

In Step 270, the ECU 50 determines whether or not the taken intake pressure PM is larger than the first valve-opening reference intake pressure PMegr20. If YES in Step 270, the ECU 50 advances the processing to Step 280. If NO in Step 270, the ECU 50 shifts the processing to Step 320.

In Step 280, the ECU 50 determines whether or not the taken intake pressure PM is larger than the second valve-opening reference intake pressure PMegr30. If YES in Step 280, the ECU 50 advances the processing to Step 290. If NO in Step 280, the ECU 50 shifts the processing to Step 310.

In Step 290, since a lodged foreign-matter diameter KΦXOP is 30 steps or more corresponding to the second EGR opening degree even though the motor step number STegr is smaller than 20 steps, the ECU 50 judges that the EGR valve has foreign matter lodging abnormality. The ECU 50 can store this determination result in the memory or execute a predetermined abnormality informing control in response to this determination result.

In Step 300, the ECU 50 executes minimum throttle opening degree control. Specifically, the ECU 50 obtains a full-closing throttle opening degree TAG according to the lodged foreign-matter diameter KΦXOP and further controls the electronic throttle device 14 from a minimum throttle opening degree TAmin to the full-closing throttle opening degree TAc. This control is configured to increase the opening degree of the electronic throttle device 14 (the throttle valve 21) in order to appropriately dilute the EGR gas that has leaked from the EGR valve 18 to the surge tank 3a due to foreign matter lodging by an increased amount of intake air. Thereafter, the ECU 50 returns the processing to Step 200.

On the other hand, in Step 310 following Step 280, since the lodged foreign-matter diameter KΦXOP corresponds to "20 to 30 steps", the ECU 50 judges that the EGR valve 18 has foreign matter lodging abnormality and then advances the processing to Step 300. The ECU 50 can store this determination result in the memory or execute a predetermined abnormality informing control in response to this determination result.

Herein, the ECU 50 can obtain the lodged foreign-matter diameter KΦXOP in a range of 20 to 30 steps by performing interpolating calculation using the following expression (I):

$$K\Phi XOP=[(PMegr30-PM)/(PMegr30-PMegr20)] \cdot (30-20)+20 \qquad (I)$$

On the other hand in Step 320 following Step 260 or 270, the ECU 50 suspends the foreign matter lodging determination on the EGR valve 18.

In Step 330, the ECU 50 releases the minimum throttle opening degree control, that is, returns the control of the electronic throttle device 14 to the normal throttle control. The ECU 50 then returns the processing to Step 200.

In Step 340 following the Step 210, since the motor step number STegr corresponding to the control opening degree of the EGR valve 18 is larger than 50, the ECU 50 takes a third valve-opening reference intake pressure PMegr60 for a third EGR opening degree (60 steps) by reference to a third valve-opening reference intake pressure map (not shown). This value, 60 steps, is one example and determined on the assumption of a certain opening degree of the EGR valve 18 (larger than the opening degree corresponding to 50 steps). The third valve-opening reference intake pressure map is also a map previously set to show the relationship of the third valve-opening reference intake pressure PMegr60 to the engine rotation speed NE and the engine load KL when the opening degree of the valve element 33 with respect to the valve seat 32 of the EGR valve 18 (i.e., the third EGR opening degree corresponding to 60 steps) is 0. This third valve-opening reference intake pressure map corresponds to one example of the reference function map in the present disclosure.

In Step 350, the ECU 50 determines whether or not the taken intake pressure PM is smaller than a value calculated by subtracting the pressure increase allowance a from the third valve-opening reference intake pressure PMegr60. If YES in Step 350, the ECU 50 advances the processing to Step 360. If NO in Step 350, the ECU 50 returns the processing to Step 200.

In Step 360, since the intake pressure PM is lower than in the neighborhood of the third valve-opening reference intake pressure PMegr60 even though the EGR valve 18 is opened at the third EGR opening degree corresponding to 60 steps, the ECU 50 determines that there is abnormality that the EGR flow rate has decreased (EGR flow rate decrease abnormality) and thus returns the processing to Step 200. In such a case where the EGR flow rate decreases when the opening degree of the EGR valve 18 relatively increases, an abnormal state such as pipe clogging of the EGR passage 17 is conceivable.

According to the foregoing EGR-valve foreign matter lodging diagnostic control, the ECU 50 is provided with the first, second, and third valve-opening reference intake pressure maps (the reference function map) set in advance to respectively show the relationships of the first, second, and third valve-opening reference intake pressures PMegr20, PMegr30, PMegr60 (the reference intake pressures) with respect to the engine rotation speed NE and the engine load KL. The ECU 50 is configured to calculate the first, second, and third valve-opening reference intake pressures PMegr20, PMegr30, PMegr60 (the reference intake pressures) according to the detected engine rotation speed NE and the detected engine load KL by reference to those maps. Furthermore, the ECU 50 is configured to determine whether or not the EGR valve 18 has abnormality in opening/closing (the foreign matter lodging abnormality of the EGR valve 18, the EGR flow rate decrease abnormality) by comparing the calculated each valve-opening reference intake pressure PMegr20, PMegr30, PMegr60 with the detected intake pressure PM.

According to the foregoing EGR-valve foreign matter lodging diagnostic control, when the engine 1 is in deceleration and the ECU 50 controls the EGR valve 18 to close to the fully-closed state or the valve-closed state, the ECU 50 is configured to determine whether or not the EGR valve 18 has abnormality in opening/closing by comparing the obtained first, second, or third valve-opening reference intake pressure PMegr20, PMegr30, PMegr60 with the detected intake pressure PM.

According to the EGR apparatus of the engine in the present embodiment described above, even though the processing contents of the EGR-valve foreign matter lodging diagnostic control are different from those in the first embodiment, the diagnosis of abnormality of the EGR valve 18 can be executed with the operations and advantages equivalent to those in the first embodiment. For the EGR-valve foreign matter removal control, moreover, the same operations and advantages as those in the first embodiment can be achieved.

According to the configuration of the present embodiment, by reference to the third valve-opening reference intake pressure PMegr60, it is possible to determine whether or not the EGR flow rate decrease abnormality is present on the assumption of abnormality such as pipe clogging in the EGR passage 17.

Moreover, according to the configuration of the present embodiment, when foreign matter lodging exists in the EGR valve 18, the minimum throttle opening degree increasing control is executed to increase the opening degree of the electronic throttle device 14 (the throttle valve 21). Thus, the EGR gas that has leaked from the EGR valve 18 to the surge tank 3a due to foreign matter lodging is appropriately diluted by intake air. This enables stabilization of the operation of the engine 1 while the EGR-valve foreign matter lodging diagnostic control is in execution.

Third Embodiment

Next, a third embodiment of an EGR apparatus of an engine embodied in a gasoline engine will be described in detail with reference to the accompanying drawings.

Figure 13:
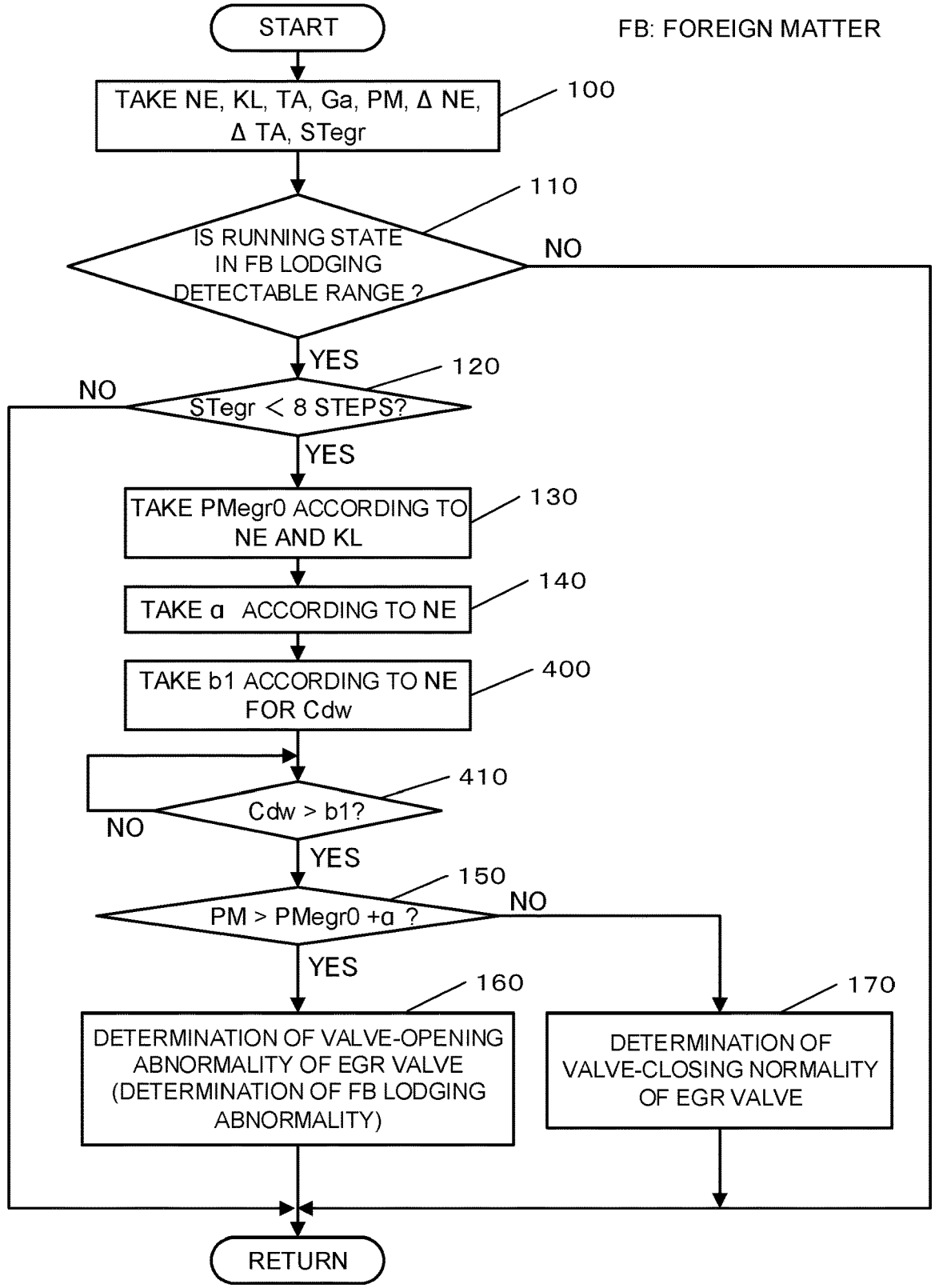
FIG. 13 is a flowchart showing processing contents of EGR-valve foreign matter lodging diagnostic control in a third embodiment.

The present embodiment differs from the first embodiment in the contents of the EGR-valve foreign matter lodging diagnostic control. FIG. 13 is a flowchart showing the control contents. In this flowchart, Step 400 and Step 410 are provided between Step 140 and. Step 150, differently from the flowchart in FIG. 4.

(EGR-Valve Foreign Matter Lodging Diagnostic Control)

Figure 14:
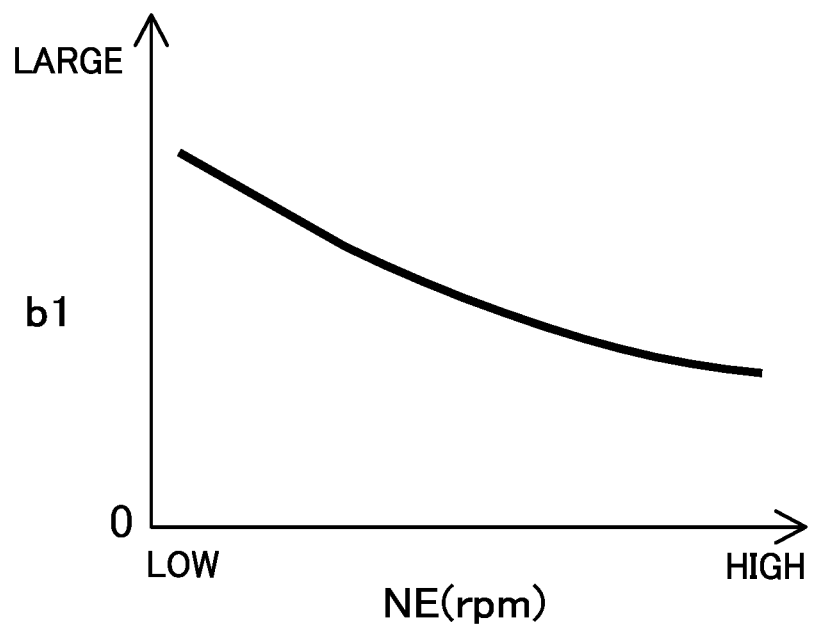
FIG. 14 is a delay time map for reference to obtain a first delay time according to engine rotation speed in the third embodiment.

When the processing enters this routine, the ECU 50 executes the processings in Steps 100 to 140 and then, in Step 400, takes a first delay time b1 according to the engine rotation speed NE for a post-deceleration steady-state determination counter Cdw. This counter Cdw indicates a counter configured to count the time until the engine 1 returns to a steady state (a steady state after deceleration, i.e., a post-deceleration steady state) from when the throttle opening degree TA becomes a predetermined opening degree B1 or less during deceleration of the engine 1. For instance, the ECU 50 can obtain this first delay time b1 according to the engine rotation speed NE by reference to a delay time map as shown in FIG. 14. In this map, the first delay time b1 is set to be longer (larger) as the engine rotation speed NE is lower.

In Step 410, the ECU 50 waits until the count of the post-deceleration steady-state determination counter Cdw becomes larger than the first delay time b1 and then advances the processing to Step 150.

According to the foregoing EGR-valve foreign matter lodging diagnostic control, the ECU 50 executes the following processings in addition to the EGR-valve foreign matter lodging diagnostic control shown in FIG. 4. Specifically, the ECU 50 is configured to start diagnosing the foreign matter lodging abnormality of the EGR valve 18 based on the detected running state after a lapse of the first delay time b1 from the start of deceleration of the engine 1.

The ECU 50 is further configured to set the first delay time b1 longer as the detected engine rotation speed NE is lower.

Figure 15A:
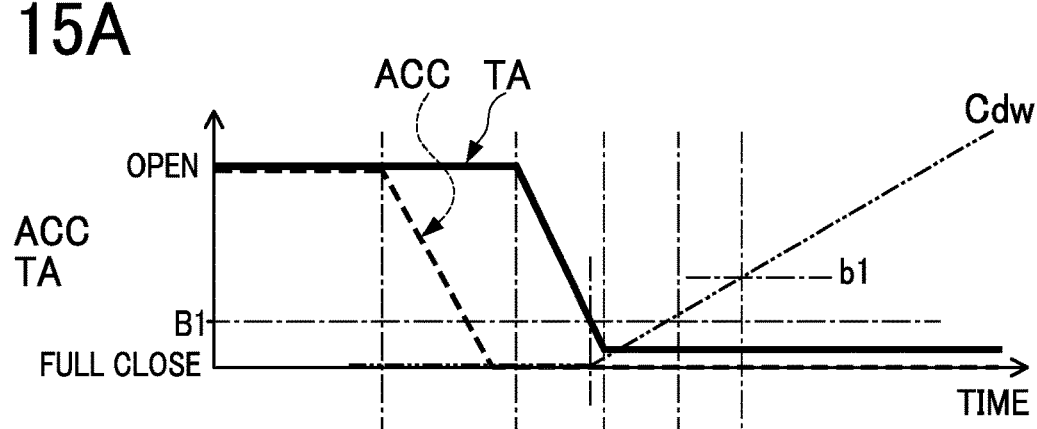
FIGS. 15A to 15D are time charts showing behaviors of various parameters in the EGR-valve foreign matter lodging diagnostic control in the third embodiment.
Figure 15B:
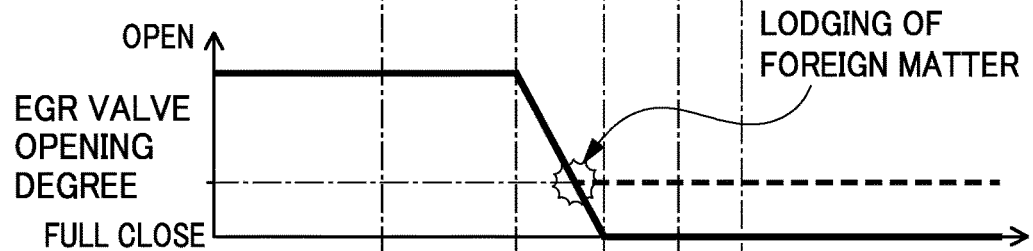
Figure 15C:
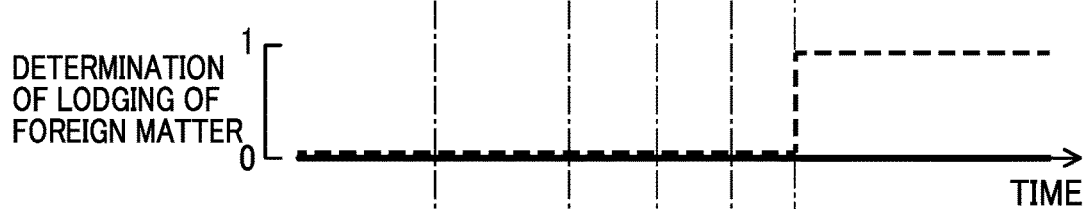
Figure 15D:
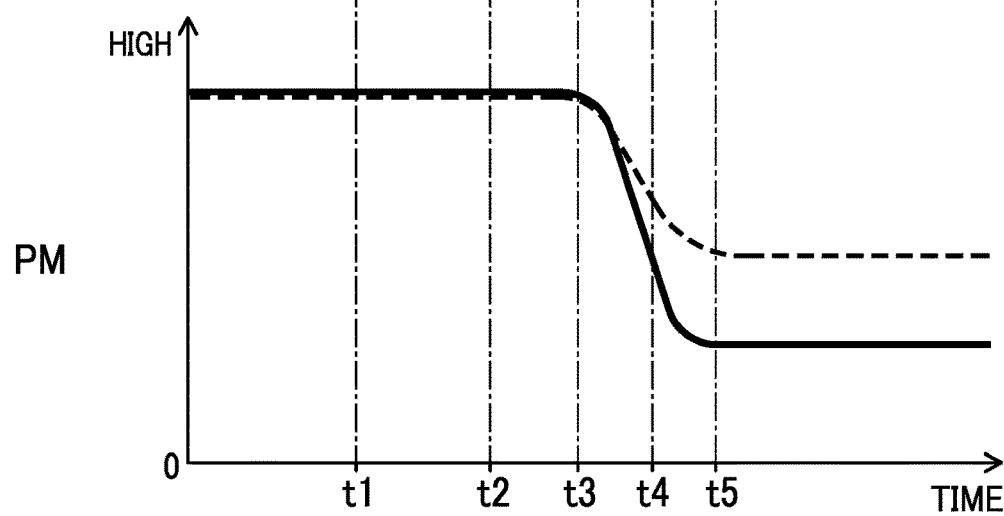

Herein, FIGS. 15A to 15D are time charts showing behaviors of various parameters in the above-described EGR-valve foreign matter lodging diagnostic control. Specifically, a chart in FIG. 15A shows an accelerator opening degree ACC (dashed line) and changes in the throttle opening degree TA (solid line), a chart in FIG. 15B shows changes in the EGR valve opening degree (a solid line indicates that the FOR valve is in a normal state and a dashed line indicates that the EGR valve is in an abnormal state due to foreign matter lodged therein; the same applies to charts in FIGS. 15C and 15D), a chart in FIG. 15C shows changes in the FAIR valve foreign matter lodging determination, and a chart in FIG. 15D shows changes in the intake pressure PM.

In FIGS. 15A to 15D, when the accelerator opening degree ACC in FIG. 15A starts decreasing at time t1, the throttle opening degree TA in FIG. 15A and the EGR valve opening degree in FIG. 15B each start decreasing a little later, at time t2. In other words, the electronic throttle device 14 and the EGR valve 18 each start closing. Thereafter, at time t3, the throttle opening degree TA in FIG. 15A reaches a predetermined deceleration opening degree and the EGR valve opening degree in FIG. 15B becomes full-close. However, when the FOR valve has foreign matter lodging just before time t3, the EGR valve opening degree does not become full-close and remains open at a certain opening degree because of foreign matter lodging as shown by the dashed line in FIG. 15B. Furthermore, as shown in FIG. 15A, when the throttle opening degree TA becomes smaller than the predetermined opening degree 131 just before time t3, the post-deceleration steady-state determination counter Cdw starts counting as indicated by a double chain line in FIG. 15A. When the count of the counter Cdw reaches the first delay time b1 at time t5, the EGR valve foreign matter lodging determination in FIG. 15C is turned to 1, that is, the EGR valve 18 is determined to have foreign matter lodging abnormality.

The reason to wait until the first delay time b1 is elapsed from when the EGR valve 18 is fully closed to when the foreign matter lodging abnormality is determined during deceleration of the engine 1 as above is because it takes a certain amount of time until the intake pressure PM becomes stable during deceleration of the engine 1. Further, the reason to obtain the first delay time b1 according to the engine rotation speed NE is because it needs a longer time for stabilization of the intake pressure PM during deceleration as the engine rotation speed NE is lower.

According to the EGR apparatus of the engine in the present embodiment described above, in addition to the operations and advantages in the first embodiment, the following operations and advantages can also be achieved. In the present embodiment, specifically, since the diagnosis of the EGR valve 18 is started when the first delay time b1 has elapsed from the start of deceleration of the engine 1, the intake pressure PM becomes stable before start of the diagnosis. This can enhance the accuracy of diagnosing the abnormality in opening/closing of the EGR valve 18.

According to the configuration of the present embodiment, furthermore, since the first delay time b1 is set to be longer as the detected engine rotation speed NE is lower, the intake pressure PM can reliably become stable before start of the diagnosis even when the engine rotation speed NE is low and it takes a long time for stabilization of the intake pressure PM. Therefore, it is possible to enhance the accuracy of diagnosing the abnormality in opening/closing of the EGR valve 18, irrespective of differences in the engine rotation speed NE.

Fourth Embodiment

Next, a fourth embodiment of an EGR apparatus of an engine embodied in a gasoline engine will be described in detail with reference to the accompanying drawings.

Figure 16:
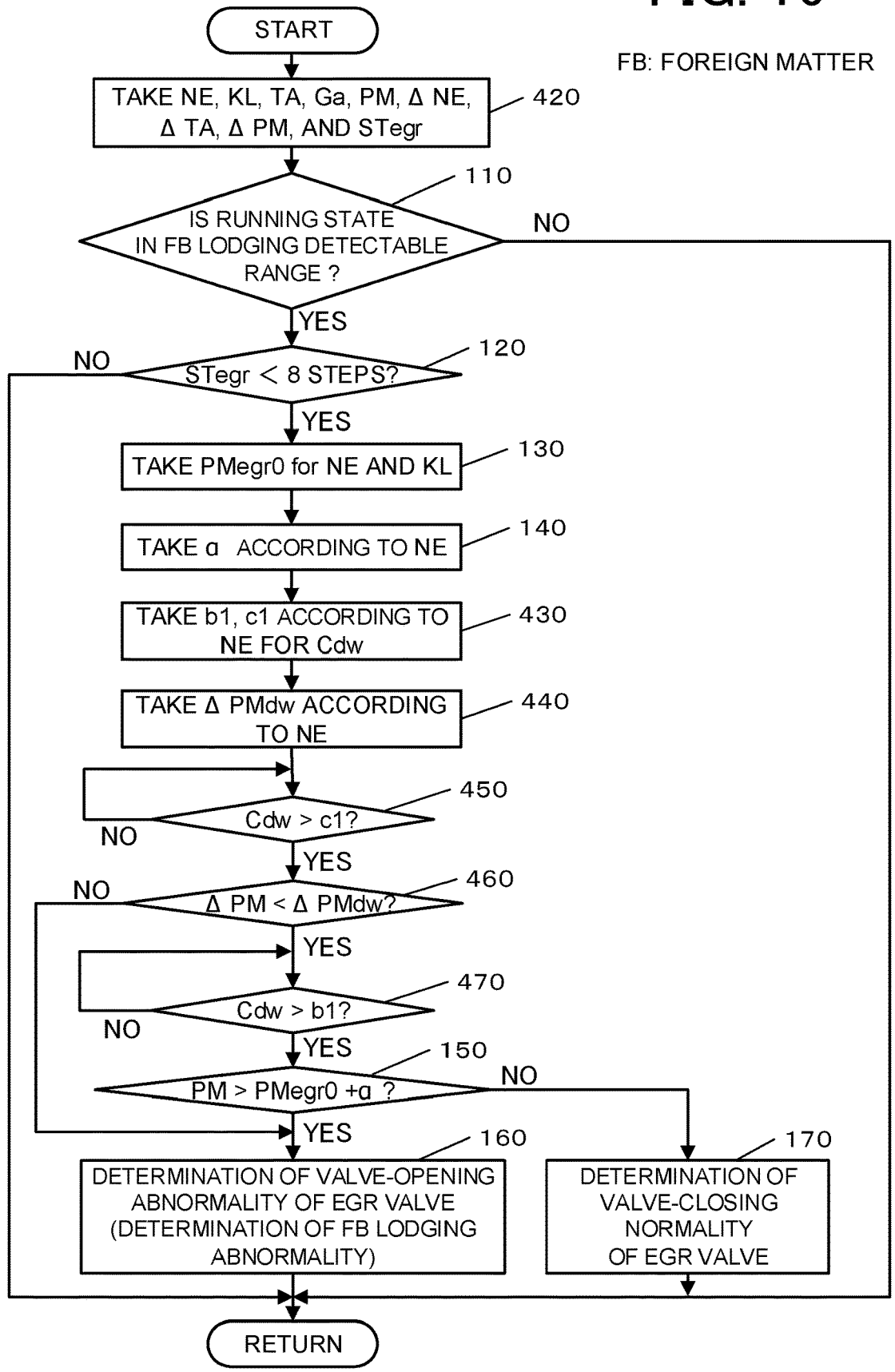
FIG. 16 is a flowchart showing processing contents of EGR-valve foreign matter lodging diagnostic control in a fourth embodiment.

The present embodiment differs from the third embodiment in the contents of the EGR-valve foreign matter lodging diagnostic control. FIG. 16 is a flowchart showing the control contents. In this flowchart, Step 420 is provided instead of Step 100, Step 430 to Step 470 are provided instead of Steps 400 and 410 between Step 140 and Step 150, differently front the flowchart in FIG. 13.

(EGR-Valve Foreign Matter Lodging Diagnostic Control)

When the processing enters this routine, firstly in Step 420, the ECU 50 individually takes engine rotation speed NE, engine load KL, throttle opening degree TA, intake amount Ga, intake pressure PM, engine rotation change ΔNE, throttle opening degree change ΔTA, intake pressure change ΔPM, and motor step number STegr. The ECU 50 can obtain a change of the intake pressure PM per unit time as the intake pressure change ΔPM.

Figure 17:
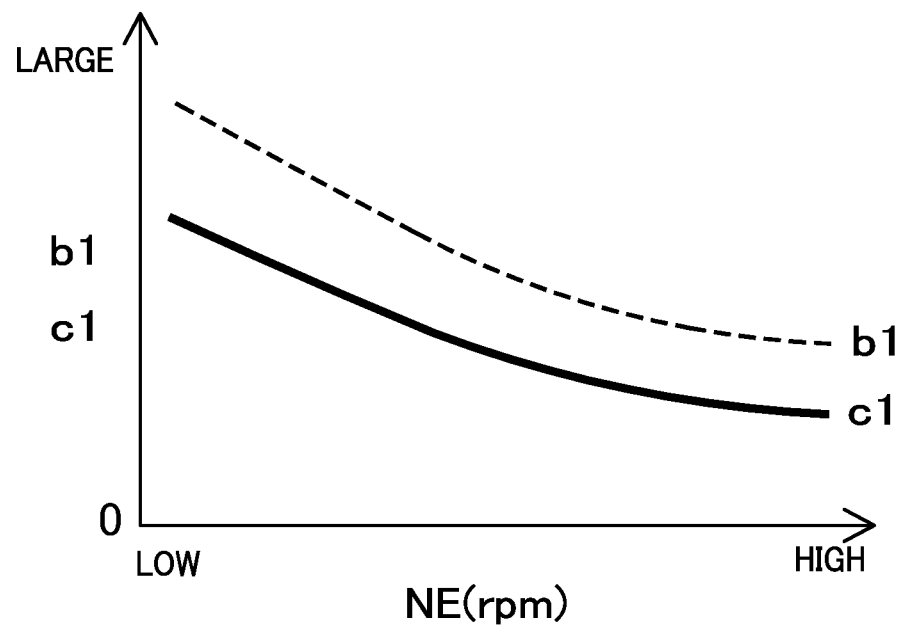
FIG. 17 is a delay time map for reference to obtain first and second delay times according to engine rotation speed in the fourth embodiment.

Subsequently, the ECU 50 executes the processings in Step 110 to Step 140 and then, in Step 430, individually takes a first delay time b1 and a second delay time c1 according to the engine rotation speed NE for the post-deceleration steady-state determination counter Cdw configured to start counting when the engine 1 is in deceleration and the throttle opening degree TA becomes a predetermined opening degree B1 or less. For instance, the ECU 50 can obtain each of the first delay time b1 and the second delay time c1 (c1<b1) according to the engine rotation speed NE by reference to a delay time map as shown in FIG. 17. In this map, the delay times b1 and c1 are set to be larger as the engine rotation speed NE is lower.

Figure 18:
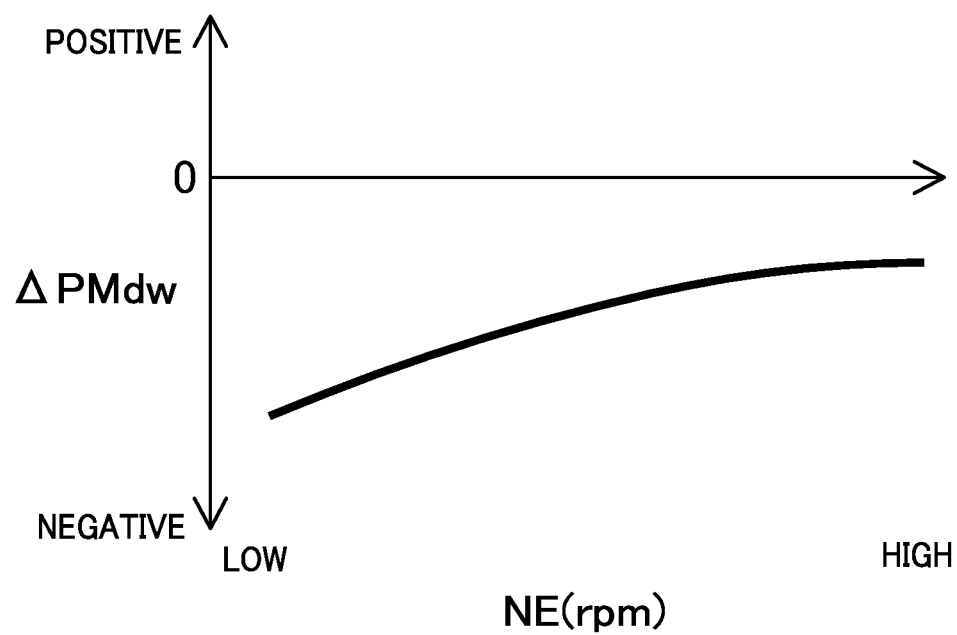
FIG. 18 is a determination intake pressure change map for reference to obtain a determination intake pressure change according to engine rotation speed in the fourth embodiment.

In Step 440, the ECU 50 then takes a determination intake pressure change ΔPMdw according to the engine rotation speed NE. For instance, the ECU 50 can this determination intake pressure change ΔPMdw according to the engine rotation speed NE by reference to a determination intake pressure change map as shown in FIG. 18, in this map, the determination intake pressure change ΔPMdw is set to increase (a negative value becomes larger) as the engine rotation speed NE is lower.

In Step 450, the ECU 50 waits until the count of the post-deceleration steady-state determination counter Cdw becomes larger than the second delay time c1 and then shifts the processing to Step 460.

In Step 460, the ECU 50 determines Whether or not the intake pressure change ΔPM is smaller than the determination intake pressure change ΔPMdw, that is, whether or not the decrease rate of the intake pressure PM (the intake pressure change ΔPM) is smaller than a predetermined decrease rate (the determination intake pressure change ΔPMdw), if YES in Step 460, indicating that the decrease rate of the intake pressure PM is relatively small, the ECU 50 advances the processing to Step 470. On the other hand, if NO in Step 460, indicating that the decrease rate of the intake pressure PM is relatively large, the ECU 50 skips to the processing in Step 160.

In Step 470, the ECU 50 waits until the count of the post-deceleration steady-state determination counter Cdw becomes larger than the first delay time b1 and then advances the processing to Step 150.

According to the foregoing EGR-valve foreign matter lodging diagnostic control, differently from the EGR-valve foreign matter lodging diagnostic control in the third embodiment, when the engine 1 is in deceleration and the ECU 50 controls the EGR valve 18 to close to the fully-closed state or the valve-closed state, when the first delay time b1 has not yet elapsed but the second delay time c1 (c1<b1) has elapsed from the deceleration start of the engine 1, the ECU 50 is configured to determine whether or not the EGR valve 18 has abnormality in opening/closing by comparing the decrease rate of the detected intake pressure PM (the intake pressure change ΔPM) and the predetermined decrease rate (the determination intake pressure change ΔPMdw).

Figure 19A:
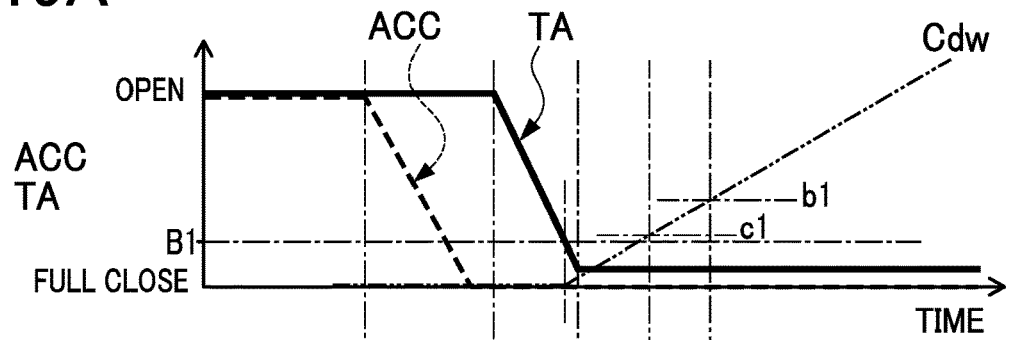
FIGS. 19A to 19E are time charts showing behaviors of various parameters the EGR-valve foreign matter lodging diagnostic control in the fourth embodiment.
Figure 19B:
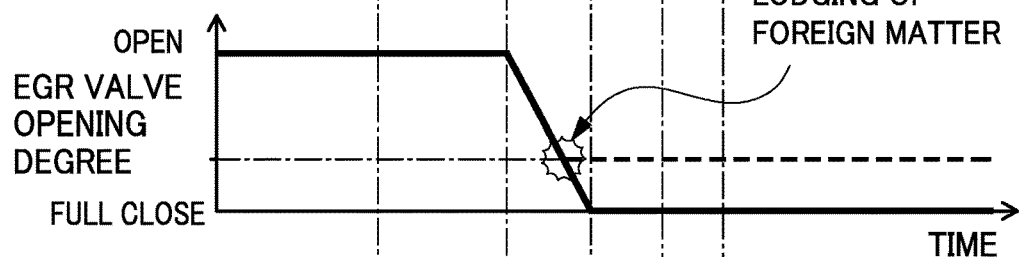
Figure 19C:
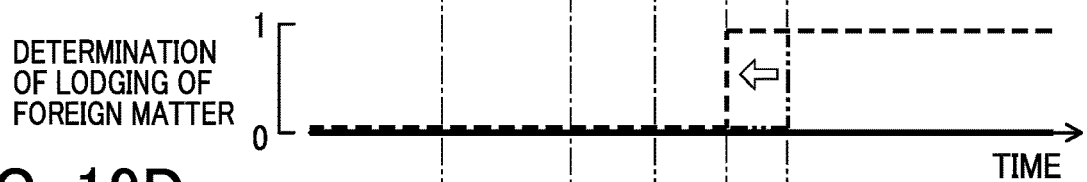
Figure 19D:
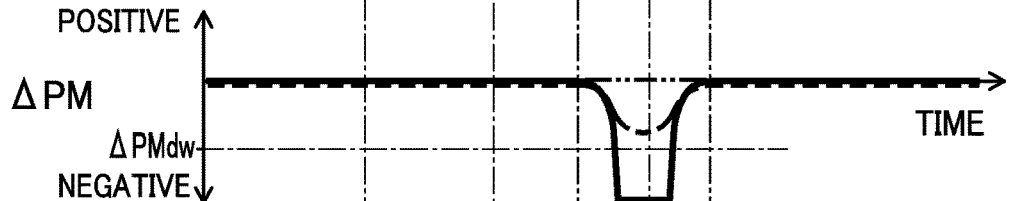
Figure 19E:
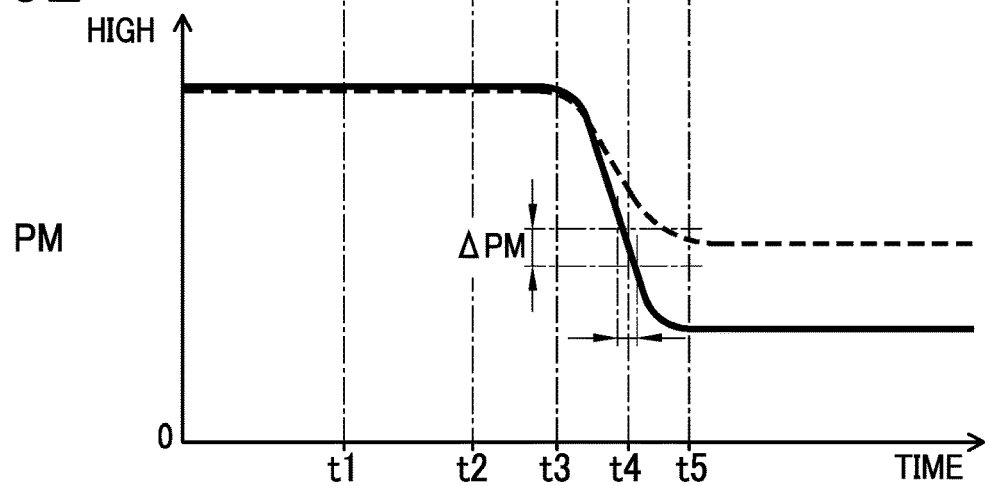

Herein, FIGS. 19A to 19E are time charts showing behaviors of various parameters in the foregoing EGR-valve foreign matter lodging diagnostic control. Specifically, a chart in FIG. 19A indicates an accelerator opening degree ACC (dashed line) and changes in the throttle opening degree TA (solid line), a chart in FIG. 19B shows changes in the EGR valve opening degree (a solid line indicates that the EGR valve is in a normal state and a dashed line indicates that the EGR valve is in an abnormal state due to foreign matter lodged therein; the same applies to charts in FIGS. 19C to 19E), a chart in FIG. 19C shows changes in the EGR valve foreign matter lodging determination, a chart in FIG. 19D shows changes in the intake pressure change ΔPM, and a chart in FIG. 19E shows changes in the intake pressure PM.

In FIGS. 19A to 19E, when the accelerator opening degree ACC in FIG. 19A starts decreasing at time t1, the throttle opening degree TA in FIG. 19A and the EGR valve opening degree in FIG. 19B each start decreasing a little later, at time t2. In other words, the electronic throttle device 14 and the EGR valve 18 each start closing. Thereafter, at time t3, the throttle opening degree TA in FIG. 19A reaches a predetermined deceleration opening degree and the EGR valve opening degree in FIG. 19B becomes full-close. However, when a foreign matter is lodged or jammed in the EGR valve in just before time t3, the EGR valve opening degree does not become full-close and remains open at a certain opening degree due to foreign matter lodging as shown by the dashed line in FIG. 19B. Furthermore, as shown in FIG. 19A, when the throttle opening degree TA becomes smaller than the predetermined opening degree B1 just before time t3, the post-deceleration steady-state determination counter Cdw starts counting as indicated by a double chain line in FIG. 19A and then the count of the counter Cdw reaches the first delay time b1 at time t4. At that time, if the intake pressure change ΔPM in FIG. 19D is not smaller than the predetermined intake pressure change ΔPMdw, the EGR valve foreign matter lodging determination is turned to 1 at time t4 as indicated by a dashed line in FIG. 19C. On the other hand, if the intake pressure change ΔPM in FIG. 19D is smaller than the predetermined intake pressure change ΔPMdw at time t4, when the post-deceleration steady-state determination counter Cdw reaches the first delay time b1 at time t5, the EGR valve foreign matter lodging determination is turned to 1 as indicated by a double chain line in FIG. 19C.

The reason to wait until the first delay time b1 or c1 is elapsed from when the EGR valve 18 is closed to when the foreign matter lodging abnormality is determined during deceleration of the engine 1 as above is because it takes a certain amount of time until the intake pressure PM becomes stable during deceleration of the engine 1. Further, the reason to obtain the first delay time b1 or c1 according to the engine rotation speed NE is because it needs a longer time for stabilization of the intake pressure PM during deceleration as the engine rotation speed. NE is lower. In case a foreign matter is lodged or jammed in the EGR valve 18, the decrease rate of the intake pressure PM of the engine 1 when changing from acceleration to deceleration is slow, that is, a change of the intake pressure PM toward decrease is small. Therefore, the foreign matter lodging determination is performed at the timing based on the intake pressure change ΔPM.

According to the EGR apparatus of the engine in the present embodiment described above, in addition to the operations and advantages in the first embodiment, the following operations and advantages can be achieved. In the present embodiment, specifically, during deceleration of the engine, when the intake pressure PM decreases but the EGR valve 18 subjected to the fully-closing control or the valve-closing control, the decrease rate of the intake pressure PM is smaller than that when EGR valve 18 is in a normal state. Herein, when the engine 1 is in deceleration and the EGR valve 18 is subjected to the fully-closing control or the valve-closing control, if the decrease rate of the detected intake pressure PM (the intake pressure change ΔPM) is smaller than the predetermined decrease rate (the determination intake pressure change ΔPMdw), it is determined that the EGR valve 18 is in an abnormal state. Accordingly, the abnormality of the EGR valve 18 in opening/closing is determined without comparison of the various reference intake pressures PMegr0, PMegr20, PMegr30, and others with the intake pressure PM. This makes it possible to perform early diagnosis about the abnormality of the EGR valve 18 in opening/closing during deceleration of the engine 1.

Fifth Embodiment

Next, a fifth embodiment of an EGR apparatus of an engine embodied in a gasoline engine will be described in detail with reference to the accompanying drawings.

Figure 20:
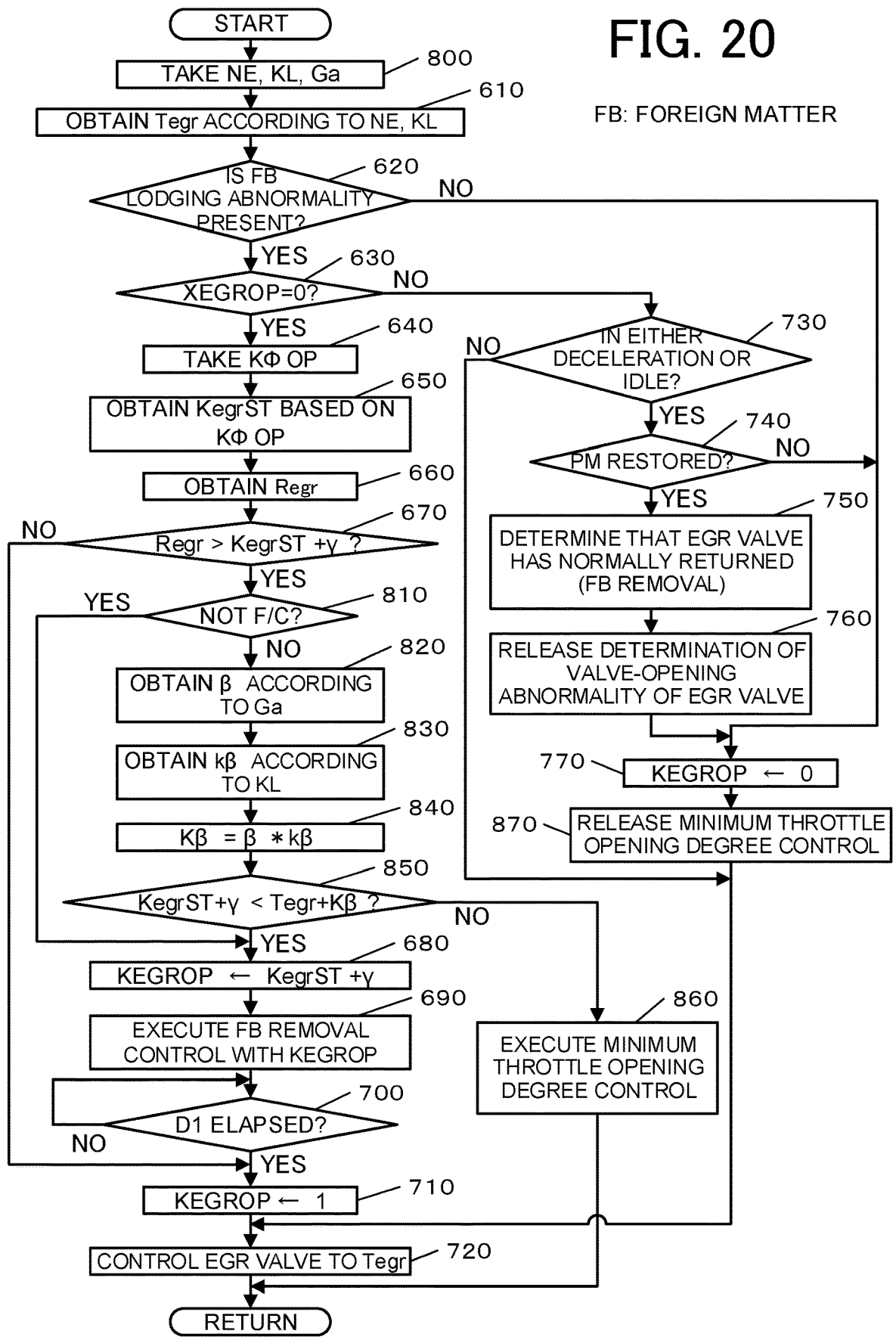
FIG. 20 is a flowchart showing processing contents of EGR-valve foreign matter removal control in a fifth embodiment.

The present embodiment differs from the first embodiment in the contents of the EGR-valve foreign matter removal control. FIG. 20 is a flowchart showing the control contents. In this flowchart, differently from the flowchart in FIG. 7, Step 800 is provided instead of Step 600, Step 810 to Step 860 are provided between Steps 670 and 680 and Step 870 is provided after Step 770.

(EGR-Valve Foreign Matter Removal Control)

When the processing enters this routine, firstly in Step 800, the ECU 50 individually takes engine rotation speed NE, engine load KL, and intake amount Ga respectively based on detections of the rotation speed sensor 52, throttle sensor 23, airflow meter 54, and others.

Subsequently, the ECU 50 executes the processings in Steps 610 to 670. If YES in Step 670, the ECU 50 determines in Step 810 whether the engine 1 is not in fuel cut (F/C), that is, whether or not fuel supply to the engine 1 is cut off. If NO in Step 810, indicating that the engine 1 is not in fuel cut, the ECU 50 advances the processing to Step 820. If YES in Step 810, indicating that the engine 1 is in fuel cut, the ECU 50 skips to the processing in Step 680.

Figure 21:
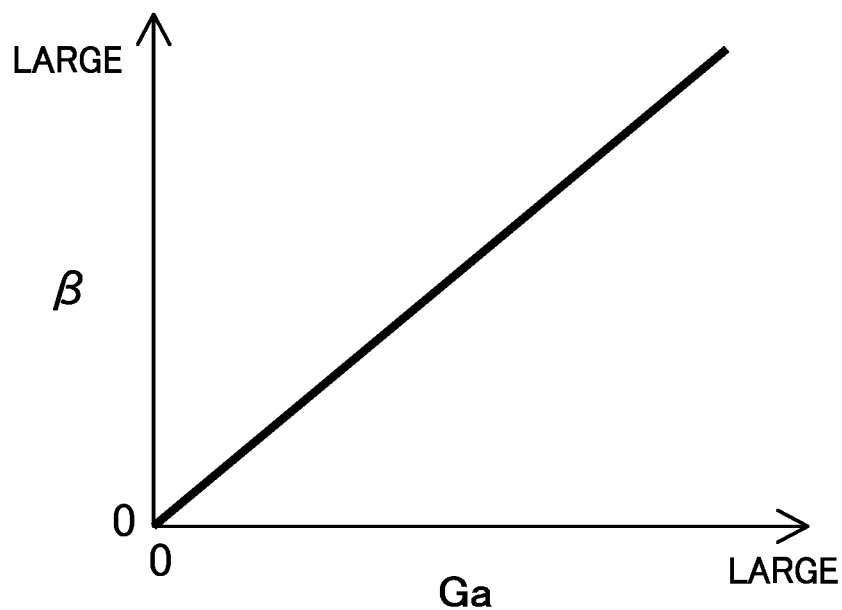
FIG. 21 is an additional opening degree map for reference to obtain an additional opening degree according to intake amount in the fifth embodiment.

In Step 820, the ECU 50 obtains an additional opening degree β according to the intake amount Ga. For instance, the ECU 50 can obtain this additional opening degree β according to the intake amount Ga by reference to an additional opening degree map as shown in FIG. 21. In this map, the additional opening degree β is set to increase in association with an increase in the intake amount Ga.

Figure 22:
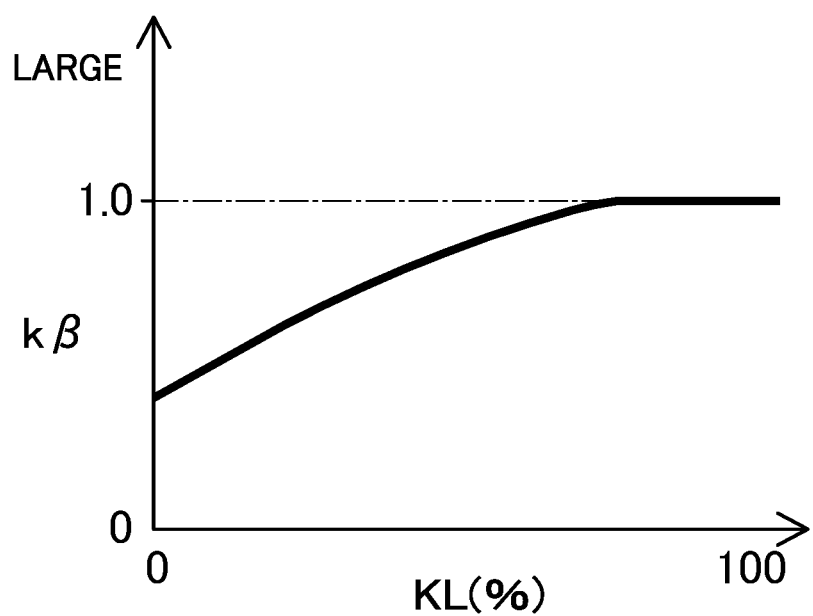
FIG. 22 is an additional opening degree correction coefficient map for reference to obtain an additional opening degree correction coefficient according to engine load in the fifth embodiment.

In Step 830, the ECU 50 further obtains an additional opening degree correction coefficient kβ according to the engine load KL. For instance, the ECU 50 can obtain this additional opening degree correction coefficient kβ according to the engine load KL by reference to an additional opening degree correction coefficient map as shown in FIG. 22. In this map, the additional opening degree correction coefficient kβ is set to increase in a curve toward 1.0 as the engine load KL increases in a range from 0% to about 80%, and to be constant at 1.0 for the engine load KL of about 80% or more.

In Step 840, subsequently, the ECU 50 multiplies the additional opening degree correction coefficient kβ to the additional opening degree β to calculate a final additional opening degree Kβ.

In Step 850, the ECU 50 determines whether or not a result by adding the foreign-matter diameter equivalent opening degree KegrST and the predetermined value γ is smaller than an addition result of the target EGR opening degree Tegr and the final additional opening degree Kβ. Herein, the addition result of the target EGR opening degree Tegr and the final additional opening degree Kβ corresponds to a predetermined upper limit opening degree of the opening degree of the valve element 33 needed to remove the foreign matter FB in the present disclosure. If YES in Step 850, the ECU 50 advances the processing to Step 680 to execute the EGR foreign-matter removal control and others. If NO in Step 850, the ECU shifts the processing to Step 860 without executing the EGR foreign-matter removal control.

In Step 860, the ECU 50 performs a predetermined minimum throttle opening degree control and returns the processing to Step 800. The minimum throttle opening degree control is a control that minimally increases the throttle opening degree TA according to foreign matter lodging in the EGR valve 18 during deceleration of the engine 1 and a control that increases the idle rotation speed in order to prevent the occurrence of misfire or deterioration of drivability in the engine 1 due to inflow of EGR gas during deceleration of the engine 1.

On the other hand, in Step 870 following Step 770, the ECU 50 releases the minimum throttle opening degree control and returns to the normal throttle control, and then shifts the processing to Step 720.

According to the foregoing EGR-valve foreign matter removal control, in addition to the processing contents of the EGR-valve foreign matter removal control in the first embodiment, the ECU 50 also executes the following processings. Specifically, when fuel supply to the engine 1 is cut off during deceleration of the engine 1, the ECU 50 immediately performs the foreign-matter removal control. On the other hand, when fuel supply to the engine 1 is not cut off during deceleration of the engine 1, the ECU 50 performs the foreign-matter removal control if the opening degree of the valve element 33 needed to remove the foreign matter FB (KegrST+γ) is smaller than the predetermined upper limit opening degree (Tegr+Kβ). The ECU 50 also corrects the upper limit opening degree (Tegr+Kβ) according to the running state (the intake amount Ga and the engine load KL) of the engine 1 related to combustion proof stress in the engine 1.

According to the configuration of the EGR apparatus of the engine in the present embodiment described above, the following operations and advantages can be achieved in addition to those in the first embodiment. In the present embodiment, specifically, when the fuel cut is performed during deceleration of the engine 1, there is no possibility such as misfire or the like due to inflow of EGR gas in the engine 1 and thus the foreign matter FB is immediately removed by the foreign-matter removal control. On the other hand, when fuel cut is not performed during deceleration of the engine 1, misfire or the like may be caused due to inflow of EGR gas in the engine 1 and thus the foreign-matter removal control is performed to remove the foreign matter FB only when the opening degree of the valve element 33 needed to remove the foreign matter FB (KegrST+γ) is smaller than the upper limit opening degree (Tegr+Kβ). Accordingly, the EGR valve 18 can be returned from the foreign matter lodging abnormality state to the normal state while preventing misfire or the like due to inflow of EGR gas in the engine 1.

According to the configuration of the present embodiment, moreover, since the upper limit opening degree (Tegr+Kβ) is corrected according to the combustion proof stress in the engine 1, as large a foreign matter FB as possible is removed in a range that the combustion proof stress in the engine 1 can be enhanced. Thus, the opportunity to remove a foreign matter FB in the EGR valve 18 can be increased.

Sixth Embodiment

Next, a sixth embodiment of an EGR apparatus of an engine embodied in a gasoline engine will be described in detail with reference to the accompanying drawings.

Figure 23:
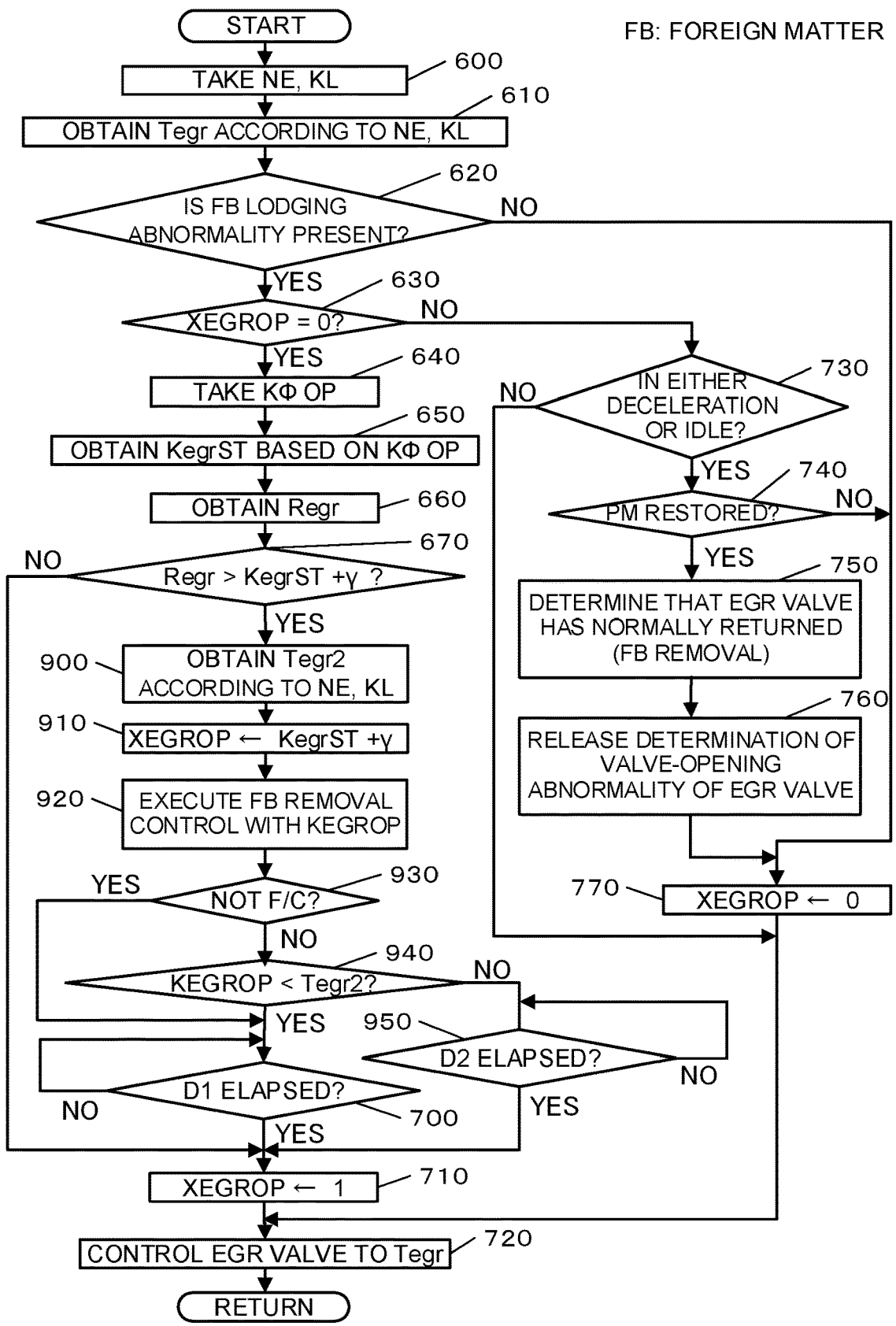
FIG. 23 is a flowchart showing processing contents of EGR-valve foreign matter removal control in a sixth embodiment.

The present embodiment differs from the first embodiment in the contents of the EGR-valve foreign matter removal control. FIG. 23 is a flowchart showing the control contents. In this flowchart, differently from the flowchart in FIG. 7, Steps 900 to 950 are provided instead of Steps 680 and 690.

(EGR-Valve Foreign Matter Removal Control)

When the processing enters this routine, the ECU 50 executes the processings in Steps 600 to 670. If YES in Step 670, the ECU advances the processing to Step 900. In Step 900, the ECU 50 obtains a misfire limit opening degree Tegr2 of the EGR valve 18 according to the engine rotation speed NE and the engine load KL. For instance, the ECU 50 can obtain this misfire limit opening degree Tegr2 according to the engine rotation speed NE and the engine load KL by reference to a misfire limit opening degree map as shown in FIG. 24. The misfire limit opening degree Tegr2 is an upper limit of the opening degree that does not cause misfire.

In Step 910, the ECU 50 subsequently sets the addition result of the foreign-matter diameter equivalent opening degree KegrST and the predetermined value γ as a foreign-matter removal opening degree KEGROP.

In Step 920, the ECU 50 executes the foreign-matter removal control with the foreign-matter removal opening degree KEGROP, Specifically, the ECU 50 controls the EGR valve 18 to open from the real EGR opening degree Regr to the foreign-matter removal opening degree KEGROP. In this case, the lodging of the foreign matter FB between the valve seat 32 and the valve element 33 is released, so that the foreign matter is peeled or blown away from the valve seat 32 or the valve element 33 by a flow of the EGR gas in the EGR passage 17.

In Step 930, the ECU 50 determines whether the engine 1 is not in fuel cut (F/C). If NO in Step 930, indicating that the engine 1 is not in fuel cut, the ECU 50 advances the processing to Step 940. If YES in Step 930, indicating that the engine 1 is in fuel cut, the ECU 50 skips to the processing in Step 700.

In Step 940, the ECU 50 determines whether or not the foreign-matter removal opening degree KEGROP (the addition result of the foreign-matter diameter equivalent opening degree KegrST and the predetermined value γ) is smaller than the misfire limit opening degree Tegr2. If YES in Step 940, indicating that the diameter of the foreign matter FB is smaller than the misfire limit opening degree, the ECU 50 advances the processing to Step 700. If NO in Step 940, indicating that the diameter of the foreign matter FB is larger than the misfire limit opening degree, the ECU 50 shifts the processing to Step 950.

In Step 950, the ECU 50 waits until a predetermined time D2 (D2<D1) is elapsed and then shifts the processing to Step 710.

According to the foregoing EGR-valve foreign matter removal control, the ECU 50 executes the following processings in addition to the processing contents of the EGR-valve foreign matter removal control in the first embodiment. Specifically, when the foreign-matter removal control is executed and then fuel cut is not performed in the engine 1, the ECU 50 compares the foreign-matter removal opening degree KEGROP with the misfire limit opening degree Tegr2 according to the current running state (the engine rotation speed NE and the engine load KL). If the foreign-matter removal opening degree KEGROP is smaller than the misfire limit opening degree Tegr2 according to the current running state (the engine rotation speed NE and the engine load KL), the ECU 50 waits until the predetermined time D1 is elapsed and then controls the EGR valve 18 to a normal target EGR opening degree Tegr. On the other hand, if the foreign-matter removal opening degree KEGROP is equal to or larger than the misfire limit opening degree Tegr2, the ECU 50 waits until a predetermined time D2 shorter than the predetermined time D1 is elapsed and then controls the EGR valve 18 to the normal target EGR opening degree Tegr.

According to the EGR apparatus of the engine in the present embodiment described as above, in addition to the operations and advantages in the first embodiment, the following operations and advantages can be achieved. In the present embodiment, specifically, when the foreign-matter removal control is executed and thereafter fuel cut is not performed in the engine 1, if the foreign-matter removal opening degree KEGROP is equal to or larger than the misfire limit opening degree Tegr2, the EGR valve 18 is controlled to the normal target EGR opening degree Tegr after a relatively short time is elapsed. Therefore, even when the foreign-matter removal opening degree KEGROP is equal to or larger than the misfire limit opening degree Tegr2, the EGR valve 18 is controlled relatively quickly toward the target EGR opening degree Tegr. This configuration can return from the EGR-valve foreign matter removal control to the normal EGR control while preventing misfire or the like due to inflow of EGR gas in the engine 1.

Seventh Embodiment

Next, a seventh embodiment of an EGR apparatus of an engine embodied in a gasoline engine will be described in detail with reference to the accompanying drawings.

Figure 25:
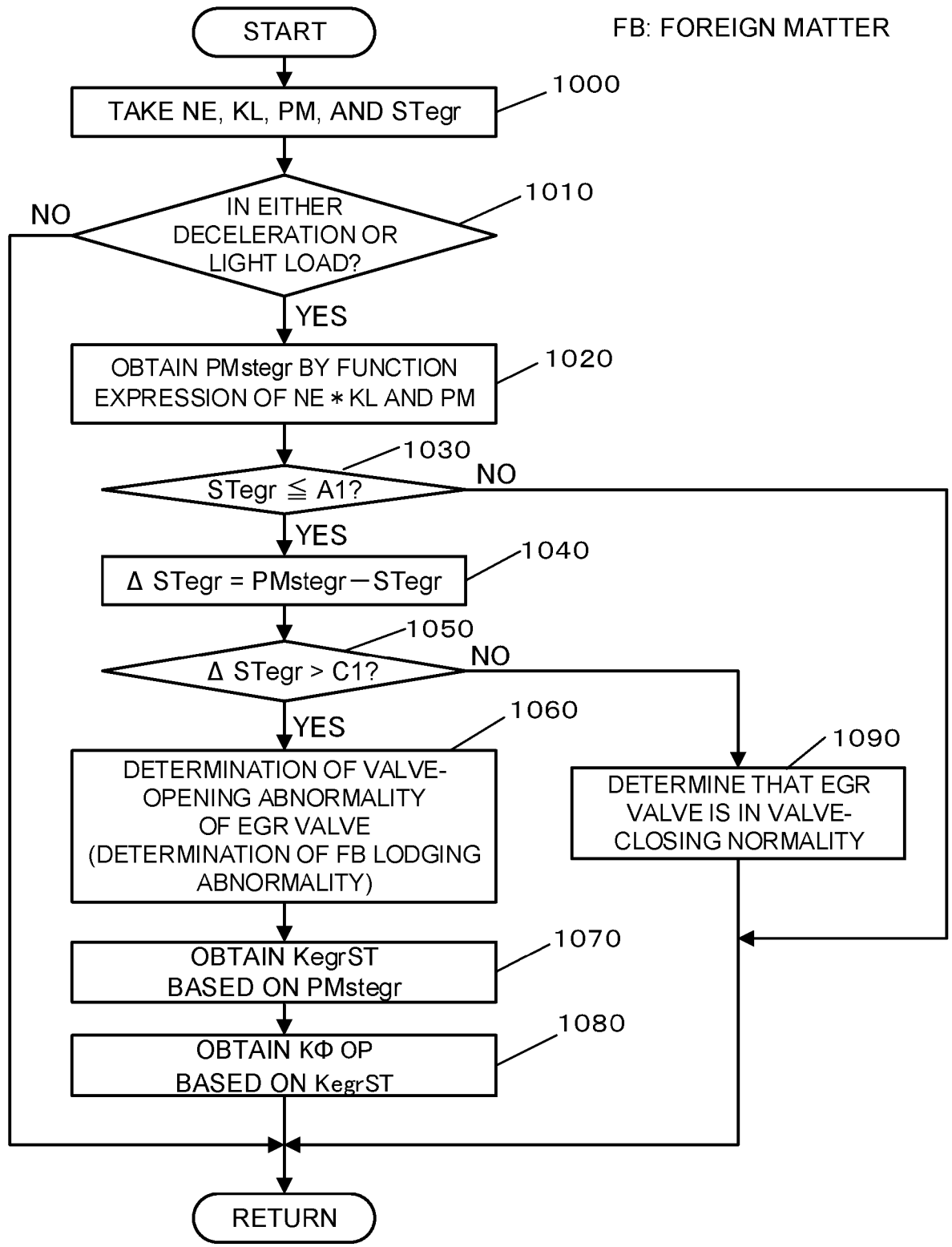
FIG. 25 is a flowchart showing processing contents of EGR-valve foreign matter lodging diagnostic control in a seventh embodiment.

The present embodiment differs from each of the foregoing embodiments in the contents of the EGR valve foreign matter lodging. FIG. 25 is a flowchart showing the control contents.

(EGR-Valve Foreign Matter Lodging Diagnostic Control)

When the processing enters this routine, firstly in Step 1000, the ECU 50 individually takes engine rotation speed NE, engine load KL, intake pressure PM, and motor step number STegr. The motor step number STegr corresponds to a control opening degree in the present disclosure.

In Step 1010, successively, the ECU 50 determines whether or not the running state of the engine 1 is in either deceleration or light load. The ECU 50 can perform this determination based on the taken engine rotation speed NE, engine load KL, intake pressure PM, and others. If YES in Step 1010, the ECU 50 advances the processing to Step 1020. If NO in Step 1010, the ECU 50 returns the processing to Step 1000.

In Step 1020, the ECU 50 obtains an estimated EGR opening degree PMstegr by a function expression of a result of multiplication of the engine rotation speed NE and the engine load KL (NE□KL) and the intake pressure PM. Herein, the ECU 50 can obtain the estimated EGR opening degree PMstegr based on a predetermined reference function expression without obtaining the full-closing reference intake pressure PMegr0 and others. This estimated EGR opening degree PMstegr is expressed as the number of motor steps and corresponds to a reference opening degree in the present disclosure.

In Step 1030, the ECU 50 determines whether or not the motor step number STegr is equal to or less than a predetermined value A1. Herein, the predetermined value A1 can be assigned a value for minute-opening or full-closing of the EGR valve 18. If YES in Step 1030, the ECU 50 advances the processing to Step 1040. If NO in Step 1030, the ECU 50 returns the processing to Step 1000.

In Step 1040, the ECU 50 calculates a step-number change amount ΔSTegr corresponding to an opening degree error of the EGR valve 18 by subtracting the motor step number STegr from the estimated EGR opening degree PMstegr.

In Step 1050, the ECU 50 determines whether or not the step-number change amount ΔSTegr is larger than a predetermined value C1. Herein, the predetermined value C1 can be assigned a value just enough to allow determination of foreign matter lodging in the EGR valve 18. If YES in Step 1050, the ECU 50 advances the processing to Step 1060. If NO in Step 1050, the ECU 50 shifts the processing to Step 1090. This determination result in Step 1050 represents a result of comparison between the estimated EGR opening degree PMstegr (the reference opening degree) and the motor step number STegr (the control opening degree).

In Step 1060, the ECU 50 determines that the EGR valve 18 has valve-opening abnormality (i.e., the EGR valve 18 is in an abnormal state because it is opened even though subjected to the fully-closing control), that is, judges that the abnormality is due to lodging of foreign matter. The ECU 50 can store this determination result in the memory or execute a predetermined abnormality informing control in response to this determination result.

In Step 1070, subsequently, the ECU 50 obtains the foreign-matter diameter equivalent opening degree KegrST based on the estimated EGR opening degree PMstegr. The ECU 50 can obtain this foreign-matter diameter equivalent opening degree KegrST according to the estimated EGR opening degree PMstegr for example by reference to a predetermined foreign-matter diameter equivalent opening degree map.

In Step 1080, the ECU 50 obtains the foreign-matter diameter equivalent ratio KΦOP based on the foreign-matter diameter equivalent opening degree KegrST. The ECU 50 can obtain this foreign-matter diameter equivalent ratio KΦOP according to the foreign-matter diameter equivalent opening degree KegrST for example by reference to a predetermined foreign-matter diameter equivalent ratio map. Thereafter, the ECU 50 returns the processing to Step 1000.

On the other hand, in Step 1090 following Step 1050, the ECU 50 determines that the EGR valve 18 is in valve-closing normality (i.e., the EGR valve 18 is in a normal state because it is closed to the fully-closed state) and thus returns the processing to Step 1000.

According to the foregoing EGR-valve foreign matter lodging diagnostic control, the ECU 50 is configured to determine whether or not the EGR valve 18 has the abnormality in opening/closing by comparing the estimated EGR opening degree PMstegr (the reference opening degree) calculated based on the detected engine rotation speed NE, the detected engine load KL, and the detected intake pressure PM with the motor step number STegr (the control opening degree) of the EGR valve 18 under control by the ECU 50.

To be concrete, the ECU 50 is provided with the reference function expression previously set to show the relationship of the estimated EGR opening degree PMstegr of the EGR valve 18 to the engine rotation speed NE, engine load KL, and intake pressure PM. The ECU 50 is thus configured to calculate the estimated EGR opening degree PMstegr according to the detected engine rotation speed NE, the detected engine load KL, and the detected intake pressure PM by reference to this reference function expression, and further compares the calculated estimated EGR opening degree PMstegr with the motor step number STegr to determine whether the EGR valve 18 has abnormality in opening/closing.

According to the configuration of the EGR apparatus of the engine in the present embodiment described above, even though the processing contents of the ECM-valve foreign matter lodging diagnostic control are different from those in each of the aforementioned embodiments, the diagnosis of abnormality of the EGR valve 18 can be executed with the operations and advantages equivalent to those in the foregoing embodiments. In other words, the estimated EGR opening degree PMstger (the reference opening degree of the EGR valve 18), calculated based on the detected engine rotation speed NE, the detected engine load KL, and the detected intake pressure PM by reference to the reference function expression, is compared with the motor step number STegr (the control opening degree of the EGR valve 18) to determine whether or not the EGR valve 18 has abnormality in opening/closing. This configuration can promptly diagnose the abnormality in opening/closing of the EGR valve 18 without limiting the conditions related to the running state of the engine 1 and the operating state of the EGR valve 18 to specific conditions.

Similarly, in the present embodiment, when the EGR valve 18 is judged to be in an abnormal state, the ECU 50 obtains the opening degree corresponding to the diameter of the foreign matter FB lodged between the valve seat 32 and the valve element 33 based on the calculated estimated EGR opening degree PMstegr (the reference opening degree of the passage 18) and the step motor number STegr (the control op of the EGR valve 18). Further, the ECU 50 may also be configured to execute the foreign-matter removal control to control the step motor 34 to open the valve element 33 at a larger opening degree than the opening degree corresponding to the obtained diameter of the foreign matter in order to remove the foreign matter FB from between the valve seat 32 and the valve element 33. When the EGR valve 18 is determined to have abnormality, accordingly, the valve element 33 is caused to open at the opening degree larger than the opening degree corresponding to the diameter of the foreign matter FB, thereby removing the foreign matter FB lodged between the valve seat 32 and the valve element 33. This configuration can quickly return the EGR valve 18 from the foreign matter lodging abnormality state to the normal state, thus avoiding the occurrence of misfire or engine stalling of the engine 1.

Supplementary Explanation

Next, supplementary matters related to the foregoing EGR-valve foreign matter lodging diagnostic control will be additionally described.

(Large-Diameter Foreign Matter Lodging Determination)

Figure 26A:
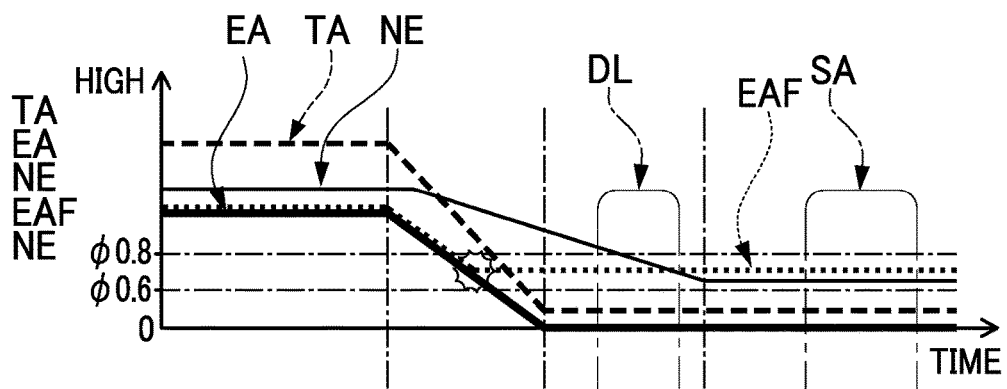
FIGS. 26A to 26C are time charts showing behaviors of various parameters during engine deceleration in supplementary explanation.
Figure 26B:
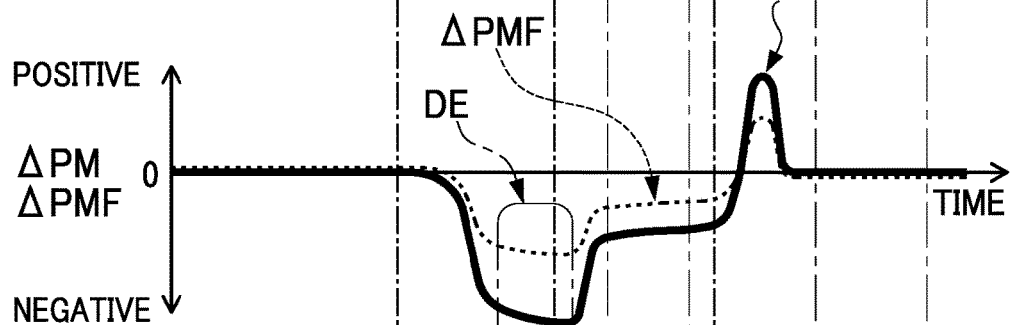
Figure 26C:
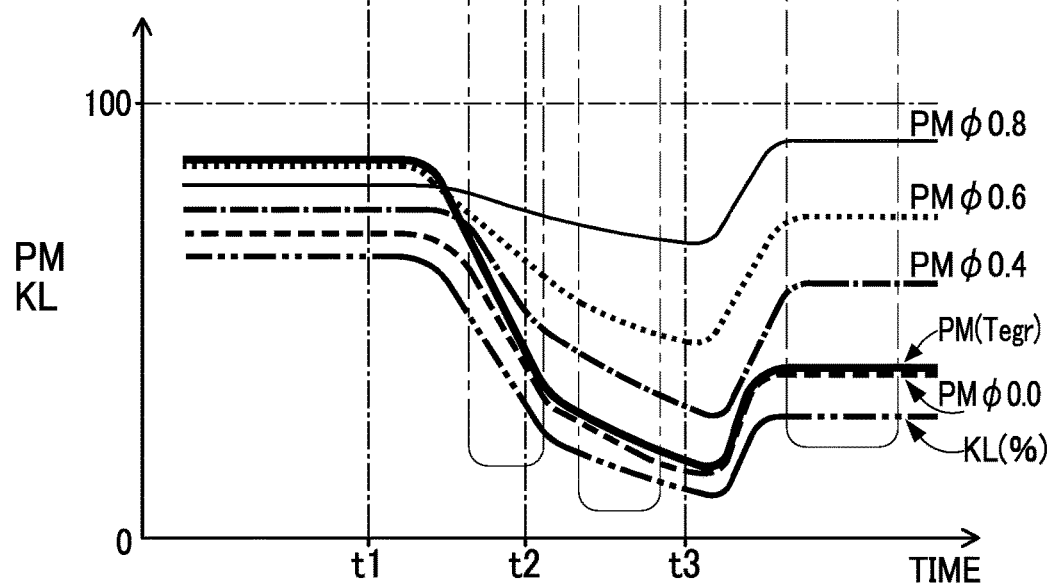

FIGS. 26A to 26C are time charts showing behaviors of various parameters during deceleration of the engine 1. Specifically, a chart in FIG. 26A indicates changes in each of the throttle opening degree TA (dashed line), the EGR opening degree EA (thick line), the EGR opening degree EAF (dotted line) with foreign matter lodging, and the engine rotation speed NE (solid line), a chart in FIG. 26B shows changes in the intake pressure change ΔPM (thick line) with no foreign matter lodging (i.e., in a normal state) and changes in the intake pressure change ΔPMF (dotted line) with foreign matter lodging. A chart in FIG. 26C indicates changes in each of the intake pressure PM and the engine load KL, in which a solid line indicates an intake pressure PMΦ0.8 at an opening degree equivalent to Φ0.8 (i.e., 0.8 mm in diameter), a dotted line indicates an intake pressure PMΦ0.6 when a foreign matter of Φ0.6 is lodged, a chain line indicates an intake pressure PMΦ0.4 at an opening degree equivalent to Φ0.4, a thick line indicates an intake pressure PM(Tegr) when no foreign matter is lodged, a dashed line indicates an intake pressure PMΦ0.0 when the EGR valve is in a fully-closed state, and a double dashed line represents an engine load KL (%). Herein, in FIGS. 26A to 26C, the range DE enclosed by a chain line indicates the initial stage of deceleration of the engine 1, the range DL enclosed by another chain line represents the late stage of deceleration of the engine 1, and the range SA enclosed by another chain line indicates a steady state after deceleration or an idle state.

After the start of deceleration of the engine 1, a rise in the intake pressure PM due to foreign matter lodging in the EGR valve 18 becomes greater as the engine rotation speed NE is lower as shown in FIGS. 2.6A to 26C, so that determination of the foreign matter lodging based on such a change can be facilitated. However, in the case of the large-diameter foreign matter lodging, a leakage amount of EGR gas is increased, leading to engine stalling. To avoid the engine stalling, therefore, it is necessary to determine foreign matter lodging at the initial stage DE of deceleration of the engine 1 and increase the intake amount before the steady state after deceleration or the idle state SA to avoid engine stalling.

(Learning of Full-Closing Reference Intake Pressure)

Figure 27:
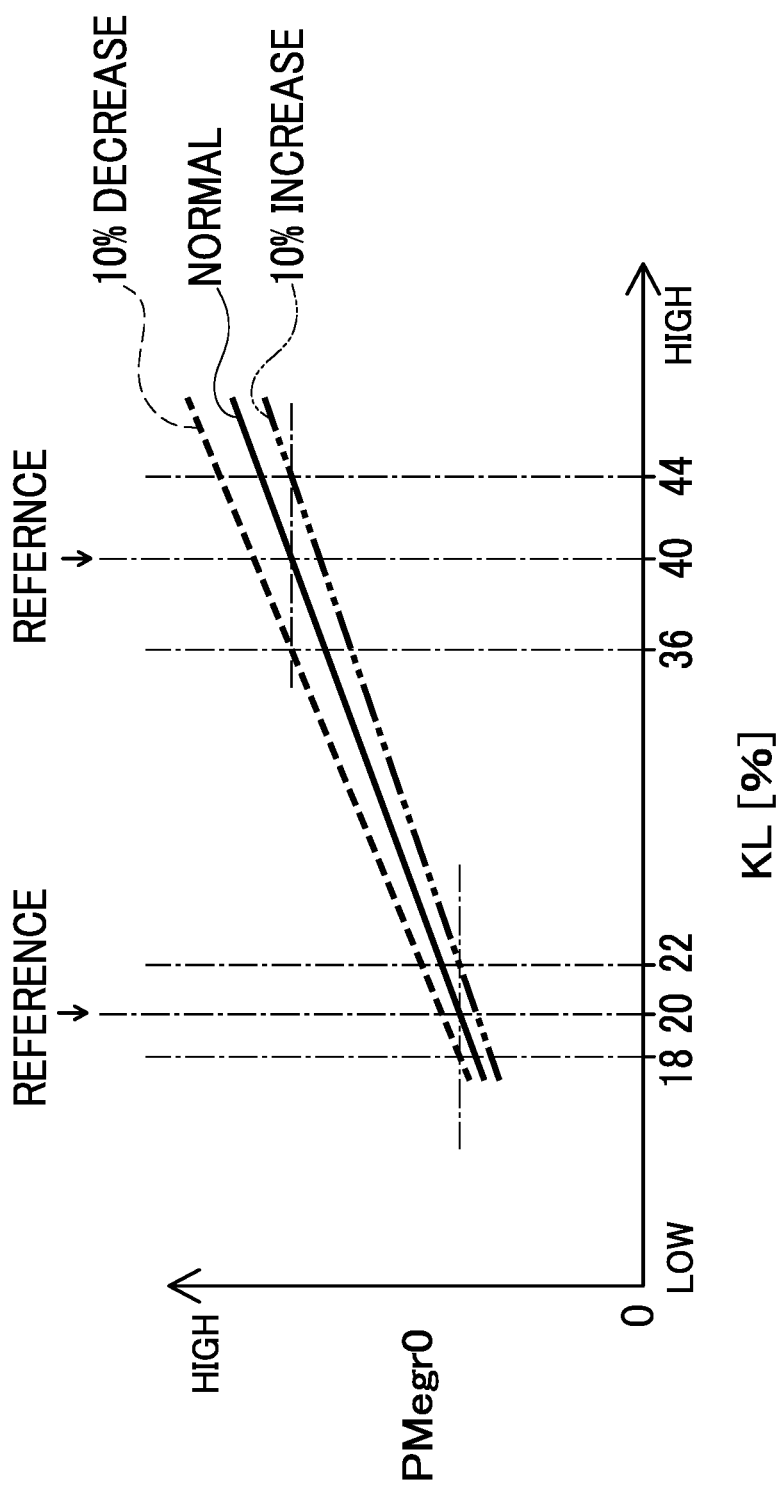
FIG. 27 is a graph showing a relationship of full-closing reference intake pressure to engine load for 500 rpm of engine rotation speed in the supplementary explanation.

FIG. 27 is a graph showing a relationship of the full-closing reference intake pressure PMegr0 to the engine load KL when the engine rotation speed NE is 500 rpm. In FIG. 27, a thick line indicates a standard fill-closing reference intake pressure PMegr0 (100 kPa_abs.@25° C.) passing 20% and 40% of the engine load KL, a dashed like represents a full-closing reference intake pressure PMegr0 corrected when the air density decreases by 10%, and a double chain line indicates a full-closing reference intake pressure PMegr0 corrected when the air density increases by 10%. In general, the influence of the increase/decrease in air density can be addressed by correcting the air density at the full-closing reference intake pressure PMegr0. In other words, when atmospheric pressure and outside temperature change, the volume flow rate increases or decreases with respect to the intake amount Ga in the same mass detected by the airflow meter, thereby exerting an effect on the intake pressure PM. Thus, it is preferable to correct the full-closing reference intake pressure PMegr0 according to the air density. For example, when the air density decreases by 10% from a standard state, the full-closing reference intake pressure PMegr0 (thick line) for 40% of the engine load KL can be corrected to the full-closing reference intake pressure PMegr0 (dashed line) for 36% of the engine load KL.

(EGR-Valve Foreign Matter Lodging Diagnostic Control in Valve-Opening Control of EGR Valve)

Figure 28:
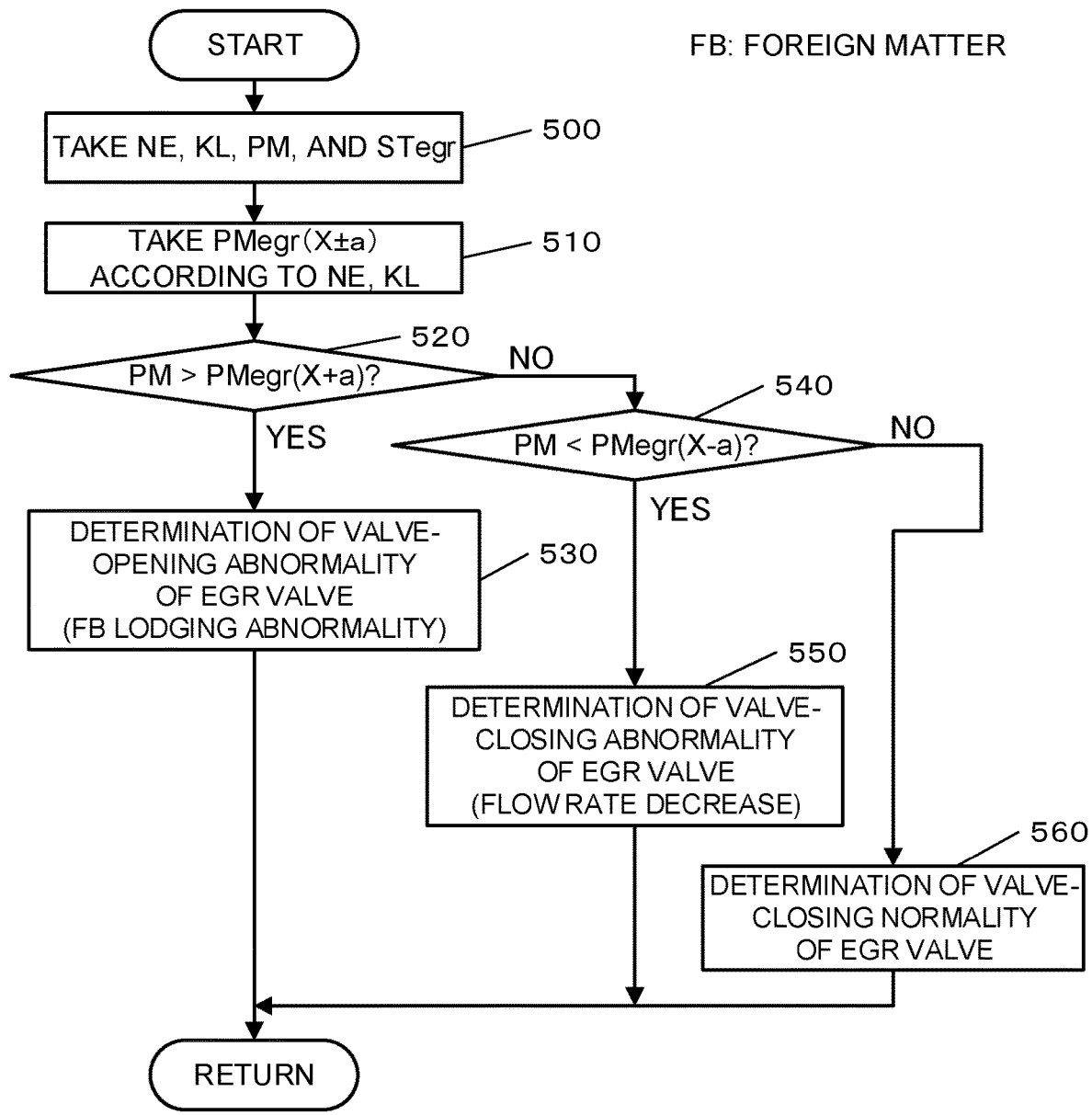
FIG. 28 is a flowchart showing processing contents of EGR-valve foreign matter lodging diagnostic control in EGR-valve valve-opening control in the supplementary explanation.

The EGR valve foreign matter lodging diagnosis can also be performed not only when the engine 1 is in deceleration and the EGR valve 18 is subjected to the fully-closing control or the valve-closing control but also when the engine 1 is in a steady state and the EGR valve 18 is subjected to valve-opening control. FIG. 28 is a flowchart showing the processing contents of the EGR-valve foreign matter lodging diagnostic control in the EGR valve opening control.

When the processing enters this routine, in Step 500, the ECU 50 individually takes the engine rotation speed NE, the engine load KL, the intake pressure PM, and the motor step number STegr of the step motor 34 corresponding to the control opening degree of the EGR valve 18.

In Step 510, successively, the ECU 50 takes a reference intake pressure PMegr(X±a) corresponding to the current opening degree of the EGR valve 18 according to the engine rotation speed NE and the engine load KL. The ECU can this reference intake pressure PMegr(X±a) corresponding to the current opening degree of the EGR valve 18 according to the engine rotation speed NE and the engine load KL by reference to a predetermined map (not shown).

In Step 520, the ECU 50 determines whether or not the intake pressure PM is larger than the reference intake pressure PMegr(X+a) corresponding to the current opening degree of the EGR valve 18. If YES in Step 520, the ECU 50 advances the processing to Step 530. If NO in Step 520, the ECU shifts the processing to Step 540.

In Step 530, the ECU 50 determines that the EGR valve 18 has valve-opening abnormality (foreign matter lodging abnormality) and thus returns the processing to Step 500. The ECU 50 can store this determination result in the memory or execute a predetermined abnormality informing control in response to this determination result.

On the other hand, in Step 540, the ECU 50 determines whether or not the intake pressure PM is smaller than the reference intake pressure PMegr(X−a) corresponding to the current opening degree of the EGR valve 18. If YES in Step 540, the ECU 50 advances the processing to Step 550. If NO in Step 540, the ECU shifts the processing to Step 560.

In Step 550, the ECU 50 determines that the EGR valve 18 has valve-closing abnormality (flow rate decrease) and thus returns the processing to Step 500. This valve-closing abnormality represents that the EGR valve 18 is in an abnormal state because it is not sufficiently opened even though subjected to the valve-opening control. The ECU 50 can store this determination result in the memory or execute a predetermined abnormality informing control in response to this determination result.

On the other hand, in Step 560, the ECU 50 determines that the EGR valve 18 is in valve-closing normality and thus returns the processing to Step 500. The ECU 50 can store this determination result in the memory.

According to the foregoing control, when the engine 1 is in a steady running state and the ECU 50 performs the valve-opening control of the EGR valve 18, the ECU 50 determines whether or not the EGR valve 18 has abnormality in opening/closing based on the detected running state.

Therefore, according to the configuration in the present embodiment, while the engine 1 is in the steady state, the abnormality in opening/closing of the EGR valve 18 can be quickly diagnosed without limiting the conditions of the operating state of the EGR valve 18 to specific conditions.

The present disclosure is not limited to each of the foregoing embodiments and may be embodied in other specific forms without departing from the essential characteristics thereof.

(1) The first to sixth embodiments described above are each configured to calculate the various reference intake pressures PMegr0, PMegr20, PMegr30, and PMegr60 according to the detected engine rotation speed NE and the detected engine load KL by reference to the various reference intake pressure maps as the reference function maps, and compare the calculated various reference intake pressures PMegr0, PMegr20, PMegr30, and PMegr60 with the detected intake pressure PM to diagnose whether or not the EGR valve 18 has abnormality. As an alternative, it may be arranged to calculate the reference intake pressure according to the detected engine rotation speed and the detected engine load by reference to a predetermined reference function expression, and compare the calculated reference intake pressure with the detected intake pressure to diagnose whether or not there is an abnormality in the EGR valve.

(2) In the seventh embodiment, it is arranged to calculate the estimated EGR opening degree PMstear (the reference opening degree of the EGR valve 18) according to the detected engine rotation speed NE and the detected engine KL by reference to the predetermined reference function expression, and compare the calculated estimated EGR opening degree PMstegr with the motor step number STegr (the control opening degree of the EGR valve 18) to diagnose whether or not the EGR valve 18 has abnormality. As an alternative, it may be arranged to calculate the estimated EGR opening degree PMstegr (the reference opening degree of the EGR valve) according to the detected engine rotation speed and the detected engine by reference to a predetermined reference function map, and compare the calculated estimated EGR opening degree with the motor step number (the control opening degree of the EGR valve) to diagnose whether or not there is an abnormality in the EGR valve.

(3) In each of the foregoing embodiments, the EGR apparatus is embodied in the so-called high-pressure-loop EGR apparatus in the gasoline engine system not equipped with a supercharger. As an alternative, the EGR apparatus may be applied to a so-called high-pressure-loop EGR apparatus and a so-called low-pressure-loop EGR apparatus in a gasoline engine system equipped with a supercharger.

(4) In each of the foregoing embodiments, the EGR apparatus of the engine in the present disclosure is applied to the gasoline engine system not equipped with a supercharger. Alternatively, this EGR apparatus of the engine may also be applied to a gasoline engine system equipped with a supercharger.

(5) In each of the foregoing embodiments, the EGR apparatus of the engine in the present disclosure is applied to a gasoline engine system. As an alternative, this EGR apparatus may be applied to a diesel engine system.

INDUSTRIAL APPLICABILITY

The present disclosure is applicable to an EGR apparatus of an engine provided in a gasoline engine or a diesel engine.

REFERENCE SIGNS LIST

1 Engine
3 Intake passage

5 Exhaust passage
17 EGR passage
18 EGR valve
23 Throttle sensor (Running-state detecting unit, Load detecting unit)
32 Valve seat
33 Valve element
34 Step motor (Actuator)
50 ECU (EGR valve control unit, EGR valve abnormality diagnosing unit, Foreign-matter removal control unit)
51 Intake pressure sensor (Running-state detecting unit, Intake pressure detecting unit)
52 Rotation speed sensor (Running-state detecting unit, Rotation speed detecting unit)
54 Airflow meter (Running-state detecting unit)

What is claimed is:

1. An EGR apparatus of an engine, the EGR apparatus comprising:
    an EGR passage configured to allow part of exhaust gas discharged from the engine to an exhaust passage to flow as EGR gas from the exhaust passage to an intake passage in order to recirculate the EGR gas into the engine;
    an EGR valve configured to regulate a flow rate of the EGR gas in the EGR passage, the EGR valve including a valve seat, a valve element provided to be seatable on the valve seat, and an actuator to move the valve element;
    a running-state detecting unit configured to detect a running state of the engine;
    an EGR valve control unit configured to control the EGR valve based on the detected running state; and
    an EGR valve abnormality diagnosing unit configured to diagnose an abnormality in opening/closing between the valve seat and the valve element of the EGR valve based on the detected running state, wherein
    the running-state detecting unit includes:
        an intake pressure detecting unit configured to detect intake pressure in the intake passage downstream of a position where the EGR gas flows from the EGR passage into the intake passage;
        a rotation speed detecting unit configured to detect a rotation speed of the engine; and
        a load detecting unit configured to detect a load of the engine,
    the EGR valve abnormality diagnosing unit is configured to determine whether or not the EGR valve has the abnormality by comparing a reference intake pressure calculated based on the detected rotation speed and the detected load with the detected intake pressure or by comparing a reference opening degree of the EGR valve calculated based on the detected rotation speed, the detected load, and the detected intake pressure with a control opening degree of the EGR valve under control by the EGR valve control unit,
    the EGR valve abnormality diagnosing unit is provided with a reference function map or a reference function expression previously set to show a relationship of the reference intake pressure to the rotation speed and the load, and
    the EGR valve abnormality diagnosing unit is configured to calculate the reference intake pressure according to the detected rotation speed and the detected load by reference to the reference function map or the reference function expression, and determine whether or not the EGR valve has the abnormality by comparing the calculated reference intake pressure with the detected intake pressure,
    when the engine is in deceleration and the EGR valve control unit the EGR valve to close to a valve-closed state, and
    the EGR valve abnormality diagnosing unit is configured to determine whether or not the EGR valve has the abnormality by comparing a decrease rate of the detected intake pressure with a predetermined decrease rate.

2. An EGR apparatus of an engine, the EGR apparatus comprising:
    an EGR passage configured to allow part of exhaust gas discharged from the engine to an exhaust passage to flow as EGR gas from the exhaust passage to an intake passage in order to recirculate the EGR gas into the engine;
    an EGR valve configured to regulate a flow rate of the EGR gas in the EGR passage,
    the EGR valve including a valve seat, a valve element provided to be seatable on the valve seat, and an actuator to move the valve element;
    a running-state detecting unit configured to detect a running state of the engine;
    an EGR valve control unit configured to control the EGR valve based on the detected running state; and
    an EGR valve abnormality diagnosing unit configured to diagnose an abnormality in opening/closing between the valve seat and the valve element of the EGR valve based on the detected running state, wherein
    the running-state detecting unit includes:
        an intake pressure detecting unit configured to detect intake pressure in the intake passage downstream of a position where the EGR gas flows from the EGR passage into the intake passage;
        a rotation speed detecting unit configured to detect a rotation speed of the engine; and
        a load detecting unit configured to detect a load of the engine,
    the EGR valve abnormality diagnosing unit is configured to determine whether or not the EGR valve has the abnormality by comparing a reference intake pressure calculated based on the detected rotation speed and the detected load with the detected intake pressure or by comparing a reference opening degree of the EGR valve calculated based on the detected rotation speed, the detected load, and the detected intake pressure with a control opening degree of the EGR valve under control by the EGR valve control unit,
    the EGR valve abnormality diagnosing unit is provided with a reference function map or a reference function expression previously set to show a relationship of the reference intake pressure to the rotation speed and the load, and
    the EGR valve abnormality diagnosing unit is configured to calculate the reference intake pressure according to the detected rotation speed and the detected load by reference to the reference function map or the reference function expression, and determine whether or not the EGR valve has the abnormality by comparing the calculated reference intake pressure with the detected intake pressure,
    the EGR apparatus further includes a foreign-matter removal control unit, and when it is determined that the EGR valve has the abnormality, the foreign-matter removal control unit is configured to:
  obtain an opening degree corresponding to a diameter of a foreign matter lodged between the valve seat and the valve element based on a foreign-matter diameter equivalent ratio obtained by dividing the detected intake pressure by the calculated reference intake pressure; and
  execute a foreign-matter removal control that controls the actuator to open the valve element at a larger opening degree than the obtained opening degree corresponding to the diameter of the foreign matter to remove the foreign matter from between the valve seat and the valve element.

3. An EGR apparatus of an engine, the EGR apparatus comprising:
  an EGR passage configured to allow part of exhaust gas discharged from the engine to an exhaust passage to flow as EGR gas from the exhaust passage to an intake passage in order to recirculate the EGR gas into the engine;
  an EGR valve configured to regulate a flow rate of the EGR gas in the EGR passage,
  the EGR valve including a valve seat, a valve element provided to be seatable on the valve seat, and an actuator to move the valve element;
  a running-state detecting unit configured to detect a running state of the engine;
  an EGR valve control unit configured to control the EGR valve based on the detected running state; and
  an EGR valve abnormality diagnosing unit configured to diagnose an abnormality in opening/closing between the valve seat and the valve element of the EGR valve based on the detected running state, wherein
  the running-state detecting unit includes:
    an intake pressure detecting unit configured to detect intake pressure in the intake passage downstream of a position where the EGR gas flows from the EGR passage into the intake passage;
    a rotation speed detecting unit configured to detect a rotation speed of the engine; and
    a load detecting unit configured to detect a load of the engine, and
  the EGR valve abnormality diagnosing unit is configured to determine whether or not the EGR valve has the abnormality by comparing a reference intake pressure calculated based on the detected rotation speed and the detected load with the detected intake pressure or by comparing a reference opening degree of the EGR valve calculated based on the detected rotation speed, the detected load, and the detected intake pressure with a control opening degree of the EGR valve under control by the EGR valve control unit,
  the EGR valve abnormality diagnosing unit is provided with a reference function map or a reference function expression previously set to show a relationship of the reference opening degree of the EGR valve to the rotation speed, the load, and the intake pressure,
  the EGR valve abnormality diagnosing unit is configured to calculate the reference opening degree according to the detected rotation speed, the detected load, and the detected intake pressure by reference to the reference function map or the reference function expression, and determine whether or not the EGR valve has the abnormality by comparing the calculated reference opening degree with the control opening degree,
  the EGR apparatus further includes a foreign-matter removal control unit, and
  when it is determined that the EGR valve has the abnormality, the foreign-matter removal control unit is configured to:
    obtain an opening degree corresponding to a diameter of a foreign matter lodged between the valve seat and the valve element according to the calculated reference opening degree, and
    execute a foreign-matter removal control that controls the actuator to open the valve element at a larger opening degree than the obtained opening degree corresponding to the diameter of the foreign matter to remove the foreign matter from between the valve seat and the valve element.

4. The EGR apparatus of an engine according to claim 2, wherein
  the foreign-matter removal control unit is configured such that
  when the engine is in deceleration and fuel supply to the engine is cut off, the foreign-matter removal control unit immediately executes the foreign-matter removal control, and
  when the engine is in deceleration and the fuel supply is not cut off, the foreign-matter removal control unit executes the foreign-matter removal control when an opening degree of the valve element needed to remove the foreign matter is smaller than a predetermined upper limit opening degree.

5. The EGR apparatus of an engine according to claim 3, wherein
  the foreign-matter removal control unit is configured such that
  when the engine is in deceleration and fuel supply to the engine is cut off, the foreign-matter removal control unit immediately executes the foreign-matter removal control, and
  when the engine is in deceleration and the fuel supply is not cut off, the foreign-matter removal control unit executes the foreign-matter removal control when an opening degree of the valve element needed to remove the foreign matter is smaller than a predetermined upper limit opening degree.

6. The EGR apparatus of an engine according to claim 4, wherein the foreign-matter removal control unit configured to correct the upper limit opening degree according to the running state of the engine related to combustion proof stress in the engine.

7. The EGR apparatus of an engine according to claim 5, wherein the foreign-matter removal control unit is configured to correct the upper limit opening degree according to the running state of the engine related to combustion proof stress in the engine.

* * * * *